US012633573B2

(12) United States Patent
Yamakaji

(10) Patent No.: US 12,633,573 B2
(45) Date of Patent: May 19, 2026

(54) NONAQUEOUS ELECTROLYTE ENERGY STORAGE DEVICE AND METHOD FOR MANUFACTURING THE SAME

(71) Applicant: GS Yuasa International Ltd., Kyoto (JP)

(72) Inventor: Masaki Yamakaji, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 632 days.

(21) Appl. No.: 17/928,843

(22) PCT Filed: Jun. 4, 2021

(86) PCT No.: PCT/JP2021/021420

§ 371 (c)(1),
(2) Date: Nov. 30, 2022

(87) PCT Pub. No.: WO2021/246525

PCT Pub. Date: Dec. 9, 2021

(65) Prior Publication Data

US 2023/0178813 A1 Jun. 8, 2023

(30) Foreign Application Priority Data

Jun. 4, 2020 (JP) ................................ 2020-097639
Jun. 4, 2020 (JP) ................................ 2020-097640

(51) Int. Cl.

| | |
|---|---|
| ***H01M 10/0569*** | (2010.01) |
| ***H01M 4/131*** | (2010.01) |
| ***H01M 4/134*** | (2010.01) |
| ***H01M 10/0525*** | (2010.01) |
| ***H01M 10/0587*** | (2010.01) |

(52) U.S. Cl.

CPC ....... *H01M 10/0569* (2013.01); *H01M 4/131* (2013.01); *H01M 4/134* (2013.01); *H01M 10/0525* (2013.01); *H01M 10/0587* (2013.01)

(58) Field of Classification Search

None
See application file for complete search history.

(56) References Cited

U.S. PATENT DOCUMENTS

| | | | | |
|---|---|---|---|---|
| 11,522,177 | B2 * | 12/2022 | Wang | H01M 4/38 |
| 2003/0165737 | A1 | 9/2003 | Nakagawa et al. | |
| 2010/0006794 | A1 | 1/2010 | Hawkins et al. | |
| 2010/0006797 | A1 | 1/2010 | Hawkins et al. | |
| 2010/0009255 | A1 | 1/2010 | Hawkins et al. | |
| 2010/0068604 | A1 | 3/2010 | Hawkins et al. | |
| 2010/0099031 | A1 | 4/2010 | Kato et al. | |
| 2010/0118598 | A1 | 5/2010 | Hawkins et al. | |
| 2012/0264010 | A1 | 10/2012 | Kato et al. | |
| 2013/0092866 | A1 | 4/2013 | Hawkins et al. | |
| 2013/0095351 | A1 | 4/2013 | Gellett et al. | |
| 2013/0095392 | A1 | 4/2013 | Shin et al. | |
| 2013/0216910 | A1 * | 8/2013 | Obrovac | H01M 4/621 29/623.5 |
| 2014/0335405 | A1 | 11/2014 | Kato et al. | |
| 2014/0377644 | A1 | 12/2014 | Ishikawa et al. | |
| 2016/0336625 | A1 | 11/2016 | Jeong et al. | |
| 2017/0098858 | A1 | 4/2017 | Kim et al. | |
| 2017/0317352 | A1 | 11/2017 | Lee et al. | |
| 2017/0324097 | A1 | 11/2017 | Lee et al. | |
| 2018/0062206 | A1 * | 3/2018 | Yang | H01M 4/382 |
| 2018/0151887 | A1 | 5/2018 | Yang et al. | |
| 2018/0340000 | A1 | 11/2018 | Sing et al. | |
| 2019/0379035 | A1 | 12/2019 | Suzuki et al. | |
| 2020/0075936 | A1 | 3/2020 | Tsujita et al. | |
| 2020/0075946 | A1 | 3/2020 | Kakura et al. | |
| 2020/0194786 | A1 | 6/2020 | Wang et al. | |
| 2020/0220223 | A1 * | 7/2020 | He | H01M 10/052 |
| 2021/0083291 | A1 | 3/2021 | Lee et al. | |

FOREIGN PATENT DOCUMENTS

| | | | |
|---|---|---|---|
| JP | 7-245099 | A | 9/1995 |
| JP | 2001-319688 | A | 11/2001 |
| JP | 2003-331918 | A | 11/2003 |
| JP | 2008-53092 | A | 3/2008 |
| JP | 2008-277001 | A | 11/2008 |
| JP | 2011-129352 | A | 6/2011 |
| JP | 2014-139921 | A | 7/2014 |
| JP | 2015-26608 | A | 2/2015 |
| JP | 2015-118852 | A | 6/2015 |
| JP | 2016-100065 | A | 5/2016 |
| JP | 2017-199678 | A | 11/2017 |
| JP | 2017-204468 | A | 11/2017 |
| JP | 2018-166071 | A | 10/2018 |
| JP | 2018-170271 | A | 11/2018 |
| JP | 2018-170272 | A | 11/2018 |
| JP | 2018-200874 | A | 12/2018 |
| JP | 2019-46759 | A | 3/2019 |
| JP | 2019046759 | A * | 3/2019 |
| JP | 2019-87454 | A | 6/2019 |
| JP | 2019-96464 | A | 6/2019 |
| JP | 2019-169425 | A | 10/2019 |
| JP | 2019-169426 | A | 10/2019 |
| JP | 2019-216094 | A | 12/2019 |
| JP | 2020-43052 | A | 3/2020 |
| JP | 2020-43053 | A | 3/2020 |
| JP | 2020-47562 | A | 3/2020 |
| JP | 2020-107428 | A | 7/2020 |
| JP | 6765663 | B2 | 10/2020 |

OTHER PUBLICATIONS

International Search Report (ISR) dated Aug. 3, 2021 filed in PCT/JP2021/021420.

* cited by examiner

*Primary Examiner* — Carlos Barcena
(74) *Attorney, Agent, or Firm* — RANKIN, HILL & CLARK LLP

(57) ABSTRACT

An aspect of the present invention is a nonaqueous electrolyte energy storage device including: a positive electrode including a positive active material layer of 5 $mAh/cm^2$ or more in capacity density per unit area; a negative electrode including metallic lithium; and a nonaqueous electrolyte including an ionic liquid and a fluorinated ether.

11 Claims, 1 Drawing Sheet

NONAQUEOUS ELECTROLYTE ENERGY STORAGE DEVICE AND METHOD FOR MANUFACTURING THE SAME

TECHNICAL FIELD

The present invention relates to a nonaqueous electrolyte energy storage device and a method for manufacturing the same.

BACKGROUND ART

Nonaqueous electrolyte secondary batteries typified by lithium ion secondary batteries are widely used for electronic devices such as personal computers and communication terminals, motor vehicles, and the like since these secondary batteries have a high energy density. The nonaqueous electrolyte secondary batteries generally include a pair of electrodes, which are electrically separated from each other by a separator, and a nonaqueous electrolyte interposed between the electrodes, and are configured to allow ions to be transferred between the two electrodes for charge-discharge. Capacitors such as lithium ion capacitors and electric double-layer capacitors are also widely used as nonaqueous electrolyte energy storage devices other than nonaqueous electrolyte secondary batteries. Metal lithium is known as a negative active material with a high energy density for use in nonaqueous electrolyte energy storage devices (see Patent Documents 1 and 2).

In recent years, nonaqueous electrolyte energy storage devices with an ionic liquid used as a nonaqueous electrolyte have also been studied (see Patent Documents 3 and 4). The ionic liquid, which itself is liquid at ordinary temperature, has advantages such as having substantially no volatility and having high flame retardancy.

PRIOR ART DOCUMENTS

Patent Documents

Patent Document 1: JP-A-2016-100065
Patent Document 2: JP-A-7-245099
Patent Document 3: JP-A-2001-319688
Patent Document 4: JP-A-2003-331918

SUMMARY OF THE INVENTION

Problems to be Solved by the Invention

The use of a nonaqueous electrolyte including an ionic liquid has been also studied in nonaqueous electrolyte energy storage devices with metal lithium used for a negative active material. In addition, from viewpoints such as increasing the energy density of a nonaqueous electrolyte energy storage device, the capacity density increased or the like is also desirable in the positive electrode. According to the studies of the inventors, however, the increased capacity density of the positive electrode in a nonaqueous electrolyte energy storage device obtained with the use of metal lithium for a negative active material and the use of a nonaqueous electrolyte including an ionic liquid, as a case, has the disadvantage of making a short circuit associated with repeated charge-discharge more likely to be caused.

The present invention has been made in view of the foregoing circumstances, and an object of the invention is to provide a nonaqueous electrolyte energy storage device including: a positive electrode including a positive active material layer of 5 $mAh/cm^2$ or more in capacity density per unit area; a negative electrode including metallic lithium; and a nonaqueous electrolyte including an ionic liquid, in which any short circuit associated with repeated charge-discharge is suppressed, and a method for manufacturing such a nonaqueous electrolyte energy storage device.

Means for Solving the Problems

A nonaqueous electrolyte energy storage device according to an aspect of the present invention is a nonaqueous electrolyte energy storage device including: a positive electrode including a positive active material layer of 5 $mAh/cm^2$ or more in capacity density per unit area; a negative electrode including metallic lithium; and a nonaqueous electrolyte including an ionic liquid and a fluorinated ether.

A nonaqueous electrolyte energy storage device according to another aspect of the present invention is a nonaqueous electrolyte energy storage device including: a positive electrode; a negative electrode including metallic lithium; and a nonaqueous electrolyte including an ionic liquid, where the positive electrode potential at an end-of-charge voltage under normal usage is higher than 4.2 V (vs. $Li/Li^+$), and the ionic liquid mainly contains an ionic liquid including no ether group.

A method for manufacturing a nonaqueous electrolyte energy storage device according to another aspect of the present invention is a method for manufacturing a nonaqueous electrolyte energy storage device, including: preparing a positive electrode including a positive active material layer of 5 $mAh/cm^2$ or more in capacity density per unit area; preparing a negative electrode including metal lithium, or a surface region capable of depositing metal lithium during charge; and preparing a nonaqueous electrolyte including an ionic liquid and a fluorinated ether.

Advantages of the Invention

According to an aspect of the present invention, it is possible to provide a nonaqueous electrolyte energy storage device including: a positive electrode including a positive active material layer of 5 $mAh/cm^2$ or more in capacity density per unit area; a negative electrode including metallic lithium; and a nonaqueous electrolyte including an ionic liquid, in which any short circuit associated with repeated charge-discharge is suppressed, and a method for manufacturing such a nonaqueous electrolyte energy storage device.

MODE FOR CARRYING OUT THE INVENTION

Figure 1:
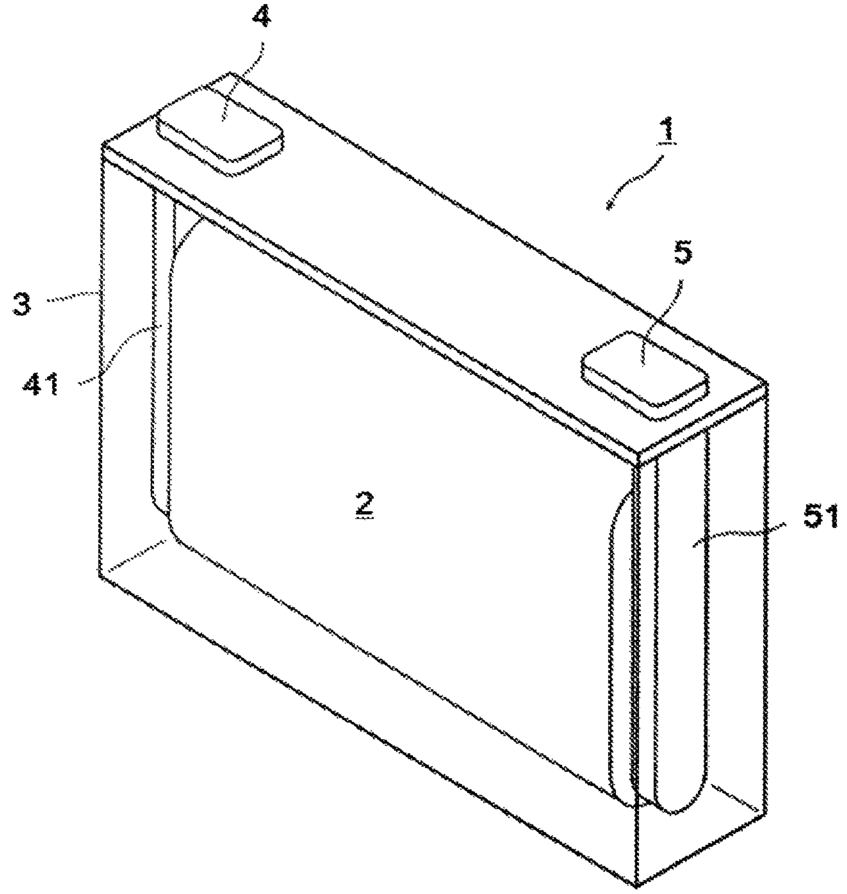
FIG. 1 is an external perspective view showing a nonaqueous electrolyte energy storage device according to one embodiment of the present invention.

First, outlines of a nonaqueous electrolyte energy storage device and a method for manufacturing the nonaqueous electrolyte energy storage device disclosed by the present specification will be described.

A nonaqueous electrolyte energy storage device according to an aspect of the present invention is a nonaqueous electrolyte energy storage device including: a positive electrode including a positive active material layer of 5 mAh/$cm^2$ or more in capacity density per unit area; a negative electrode including metallic lithium; and a nonaqueous electrolyte including an ionic liquid and a fluorinated ether.

A nonaqueous electrolyte energy storage device according to an aspect of the present invention is a nonaqueous electrolyte energy storage device including: a positive electrode including a positive active material layer of 5 mAh/$cm^2$ or more in capacity density per unit area; a negative electrode including metallic lithium; and a nonaqueous electrolyte including an ionic liquid, in which any short circuit associated with repeated charge-discharge is suppressed. Although the reason therefor is not clear, the following reason is presumed. In general, in a nonaqueous electrolyte energy storage device in which metal lithium is used for a negative active material, metal lithium may be precipitated in a dendritic form at the surface of the negative electrode during charge (hereinafter, metal lithium in a dendritic form is referred to as a "dendrite"). When the dendrite grows, penetrates a separator, and then comes into contact with a positive electrode, a short circuit is caused. In addition, the reductive decomposition of the component constituting the nonaqueous electrolyte on the negative electrode can also constitute a factor of promoting the growth of the dendrite. Then, in the case of a high capacity density per unit area of the positive active material layer, the current density per unit area in the case of charge is believed to be increased, thus increasing the growth rate of the dendrite at the surface of the negative electrode is high, and making a short circuit more likely to be caused. In contrast, in the nonaqueous electrolyte energy storage device according to one aspect of the present invention, the nonaqueous electrolyte including the ionic liquid includes therein the fluorinated ether, thereby decreasing the viscosity of the nonaqueous electrolyte, and suppressing the reductive decomposition of the ionic liquid itself. In addition, fluorinated ethers are less likely to undergo reductive decomposition in fluorinated solvents. From the foregoing, the nonaqueous electrolyte energy storage device according to an aspect of the present invention is presumed to suppress any short circuit associated with repeated charge-discharge, in spite of the high capacity density per unit area of the positive active material layer.

The nonaqueous electrolyte energy storage device is also high in coulombic efficiency. Although the reason therefor is also not clear, the following reason is presumed. The nonaqueous electrolyte including the ionic liquid includes therein the fluorinated ether, thereby, as described above, decreasing the viscosity of the nonaqueous electrolyte, and suppressing the reductive decomposition of the ionic liquid itself. In addition, the fluorinated ether is unlikely to be coordinated to ions in the nonaqueous electrolyte, and thus not believed to inhibit the ionic liquid property of relatively increasing the coulombic efficiency of the nonaqueous electrolyte energy storage device in which metal lithium is used for the negative active material. Further, as presented in the comparative examples described later, the coulombic efficiency decreased when a nonaqueous electrolyte including an ionic liquid includes therein another fluorinated solvent besides a fluorinated ether is presumed to be because the other fluorinated solvent coordinated to ions in the nonaqueous electrolyte inhibits the property of the ionic liquid. As described above, for the nonaqueous electrolyte energy storage device, the use of the nonaqueous electrolyte in which the ionic liquid and the fluorinated ether are mixed is presumed to decrease the viscosity without inhibiting the property of the ionic liquid, and as a result, increase the coulombic efficiency. In addition, the nonaqueous electrolyte energy storage device is capable of maintaining the high coulombic efficiency even when charge-discharge is repeated, and as a result, the capacity retention ratio after charge-discharge cycles is also high. Furthermore, the nonaqueous electrolyte energy storage device includes the positive electrode including the positive active material layer of 5 mAh/$cm^2$ or more in capacity density per unit area and the negative electrode including metal lithium, the nonaqueous electrolyte energy storage device is high in energy density.

The capacity density per unit area of the positive active material layer has a value determined by the following formula (a) in the case of the clear design of the nonaqueous electrolyte energy storage device, or has a value determined by the following capacity verification test and the following formula (b) in the case of the unknown design of the nonaqueous electrolyte energy storage device. In the following formulas (a) and (b), the "capacity density" refers to a capacity density per unit area of the positive active material layer. In addition, in the following formula (a), the "rated capacity" refers to a discharge capacity in the case of discharging the nonaqueous electrolyte energy storage device to a fully discharged state after the nonaqueous electrolyte energy storage device is brought into a fully charged state by employing charge-discharge conditions recommended or specified for the nonaqueous electrolyte energy storage device, and when a charger for the nonaqueous electrolyte energy storage device is prepared, the rated capacity refers to a case where the device is charged by applying the charger. The "effective area" refers to an area where the positive active material layer and the negative active material layer face each other.

(Case of Clear Design of Nonaqueous Electrolyte Energy Storage Device)

$$\text{Rated capacity (mAh) of nonaqueous electrolyte energy storage device/effective area (cm}^2\text{) of positive active material layer=capacity density (mAh/cm}^2\text{)} \quad (a)$$

(Case of Unknown Design of Nonaqueous Electrolyte Energy Storage Device)

The positive electrode obtained by disassembling the nonaqueous electrolyte energy storage device and punching the disassembled nonaqueous electrolyte energy storage device into an arbitrary area is subjected to a capacity verification test. First, the nonaqueous electrolyte energy storage device is disassembled, the positive electrode is taken out, the nonaqueous electrolyte attached to the positive electrode taken out is sufficiently washed with a dimethyl carbonate, and dried at room temperature all day and night, and then a test battery with a metal lithium electrode as a counter electrode is assembled. For the metal lithium electrode in this case, pure-metallic lithium is used. The capacity verification test is performed at a current value of 10 mA per 1 g of the positive active material layer. The test battery is subjected to constant current charge until the voltage becomes an end-of-charge voltage under normal usage, so that the energy storage device is brought to a fully charged state. After a pause, the test battery is subjected to constant current discharge to the lower limit voltage under normal usage. From the discharge capacity (mAh) obtained in the capacity verification test and the area ($cm^2$) of the positive active material layer in the test battery, the capacity density (mAh/$cm^2$) per unit area of the positive active material layer is determined by the following formula (b). Operations from disassembly of the nonaqueous electrolyte energy storage device to the assembly of the test battery are performed in an argon atmosphere at a dew point of −60° C.

or lower. It is to be noted that, the term "under normal usage" means use of the nonaqueous electrolyte energy storage device while employing charge-discharge conditions recommended or specified in the nonaqueous electrolyte energy storage device, and when a charger for the nonaqueous electrolyte energy storage device is prepared, this term means use of the nonaqueous electrolyte energy storage device by applying the charger.

Discharge capacity (mAh) obtained in capacity verification test/area ($cm^2$) of positive active material layer in test battery=capacity density (mAh/$cm^2$) (b)

It is to be noted that the negative electrode provided in the nonaqueous electrolyte energy storage device has only to contain metal lithium at least in a charged state, and in a discharged state, may contain no metal lithium. For example, the nonaqueous electrolyte energy storage device may be configured such that the negative electrode has metal lithium in a charged state, with the metal lithium being precipitated in at least a partial region of the negative electrode surface during charge, and the negative electrode has substantially no metal lithium in a discharged state, with substantially all of the metal lithium at the negative electrode surface being eluted as lithium ions into the nonaqueous electrolyte during discharge.

The positive electrode preferably contains a lithium-transition metal composite oxide that has an $\alpha$-$NaFeO_2$-type crystal structure or a spinel-type crystal structure, or a polyanion compound containing nickel, cobalt, or manganese. When the nonaqueous electrolyte energy storage device includes that positive electrode with a high oxidation-reduction potential as described above, the energy density can be increased. In this regard, in a conventional nonaqueous electrolyte energy storage device including a positive electrode with a high oxidation-reduction potential, in the case of repeating charge-discharge such that the positive electrode potential reaches a high potential, the amount of electricity used in the positive electrode for decomposition of a component with low oxidation resistance in the nonaqueous electrolyte is believed to be, for example, used for growth of dendrites in the negative electrode, thereby making a short circuit more likely to be caused. In contrast, the nonaqueous electrolyte provided in the nonaqueous electrolyte energy storage device is also favorable in terms of oxidation resistance, and even when such a positive electrode with a high oxidation-reduction potential is used, capable of suppressing any short circuit associated with repeated charge-discharge, and also high in coulombic efficiency.

In the nonaqueous electrolyte energy storage device, the positive electrode potential at the end-of-charge voltage under normal usage is preferably 3.5 V (vs. $Li/Li^+$) or higher. The positive electrode potential at the end-of-charge voltage under normal usage is increased, thereby allowing the energy density of the nonaqueous electrolyte energy storage device to be increased. In addition, the nonaqueous electrolyte provided in the nonaqueous electrolyte energy storage device is also favorable in terms of oxidation resistance, and even when the positive electrode potential at the end-of-charge voltage under normal usage is set to be high as described above, capable of suppressing any short circuit associated with repeated charge-discharge, and also high in coulombic efficiency.

The nonaqueous electrolyte mentioned above preferably further contains a lithium bis(fluorosulfonyl)imide (LiFSI). When the nonaqueous electrolyte contains LiFSI, the LiFSI, for example, has a relatively high ionic conductivity, and forms a favorable coating film on the surface of the negative electrode, thus allowing any short circuit associated with repeated charge-discharge to be further suppressed, and allowing the coulombic efficiency to be also further increased.

The nonaqueous electrolyte further includes a lithium salt, and the content of the lithium salt in the nonaqueous electrolyte is preferably 1.5 mol/$dm^3$ or more. The content of the lithium salt in the nonaqueous electrolyte is set to be 1.5 mol/$dm^3$ or more, thereby allowing any short circuit associated with repeated charge-discharge to be further suppressed.

The number of fluorine atoms in the fluorinated ether is preferably two or more and six or less. The use of such a fluorinated ether allows any short circuit associated with repeated charge-discharge to be further suppressed. Although the reason therefor is not clear, for example, such a fluorinated ether is presumed to have moderate oxidation resistance, and have a high-quality coating film formed on the surface of the negative electrode.

The ratio of the number of fluorine atoms to the total of the number of hydrogen atoms and the number of fluorine atoms in the fluorinated ether mentioned above is preferably 10% or more and 50% or less. The use of such a fluorinated ether also allows any short circuit associated with repeated charge-discharge to be further suppressed.

The fluorinated ether mentioned above is preferably represented by the following formula (1).

$$R^1—O—R^2 \quad (1)$$

In the formula (1), $R^1$ is a fluorinated hydrocarbon group. $R^2$ is a hydrocarbon group.

The use of such a fluorinated ether also allows any short circuit associated with repeated charge-discharge to be further suppressed.

The content of the fluorinated ether in all of the nonaqueous solvents included in the nonaqueous electrolyte is preferably 90% by volume or more. In such a case, the viscosity, reductive decomposition resistance, and the like of the nonaqueous electrolyte are improved, thereby allowing any short circuit associated with repeated charge-discharge to be further suppressed. It is to be noted that the ionic liquid is not included in the nonaqueous solvent.

The nonaqueous electrolyte energy storage device preferably includes a separator of 10 μm or more and 40 μm or less in average thickness. The use of the separator with the average thickness within the range mentioned above allows any short circuit associated with repeated charge-discharge to be further suppressed.

The ionic liquid mentioned above preferably mainly contains an ionic liquid including no ether group. When the ionic liquid mainly containing an ionic liquid including no ether group is used, the decomposition of the ionic liquid is suppressed even when charge-discharge is repeated, and as a result, any short circuit associated with repeated charge-discharge is further suppressed.

The phrase "the ionic liquid mainly contains an ionic liquid including no ether group" means that the content of the ionic liquid including no ether group with respect to the whole ionic liquid is more than 50% by volume.

A nonaqueous electrolyte energy storage device according to another aspect of the present invention is a nonaqueous electrolyte energy storage device including: a positive electrode; a negative electrode including metallic lithium; and a nonaqueous electrolyte including an ionic liquid, where the positive electrode potential at an end-of-charge voltage under normal usage is higher than 4.2 V (vs. $Li/Li^+$), and the ionic liquid mainly contains an ionic liquid including no ether group. According to another aspect of the present invention, it is possible to solve the problem of providing a nonaqueous electrolyte energy storage device including a positive electrode, a negative electrode including metallic lithium, and a nonaqueous electrolyte including an ionic liquid, in which any short circuit is suppressed in the case of repeating charge-discharge to reach a high potential such that the positive electrode potential exceeds 4.2 V (vs. $Li/Li^+$).

A method for manufacturing a nonaqueous electrolyte energy storage device according to an aspect of the present invention is a method for manufacturing a nonaqueous electrolyte energy storage device, including: preparing a positive electrode including a positive active material layer of 5 $mAh/cm^2$ or more in capacity density per unit area; preparing a negative electrode including metal lithium, or a surface region capable of depositing metal lithium during charge; and preparing a nonaqueous electrolyte including an ionic liquid and a fluorinated ether.

The manufacturing method is capable of manufacturing a nonaqueous electrolyte energy storage device including: a positive electrode including a positive active material layer of 5 $mAh/cm^2$ or more in capacity density per unit area; a negative electrode including metallic lithium; and a nonaqueous electrolyte including an ionic liquid, in which any short circuit associated with repeated charge-discharge is suppressed. In addition, the nonaqueous electrolyte energy storage device obtained by the manufacturing method is also high in coulombic efficiency, energy density, and capacity retention ratio after a charge-discharge cycle.

Hereinafter, a nonaqueous electrolyte energy storage device according to an embodiment of the present invention, a method for manufacturing the nonaqueous electrolyte energy storage device, and other embodiments will be described.

<Nonaqueous Electrolyte Energy Storage Device>

The nonaqueous electrolyte energy storage device according to an embodiment of the present invention has a positive electrode, a negative electrode, and a nonaqueous electrolyte. Hereinafter, a nonaqueous electrolyte secondary battery (hereinafter, also simply referred to as a "secondary battery") will be described as an example of the nonaqueous electrolyte energy storage device. The positive electrode and the negative electrode usually form an electrode assembly in which the positive electrode and the negative electrode are alternately superposed by being stacked or wound with a separator interposed therebetween. The electrode assembly is housed in a case, and the case is filled with the nonaqueous electrolyte. The nonaqueous electrolyte is interposed between the positive electrode and the negative electrode. As the case, a known metal case, a resin case or the like, which is usually used as a case of a nonaqueous electrolyte energy storage device, can be used.

(Positive Electrode)

The positive electrode has a positive substrate and a positive active material layer disposed directly or via an intermediate layer on the positive substrate.

The positive substrate has conductivity. Having "conductivity" means having a volume resistivity of $10^7$ Ω·cm or less that is measured in accordance with JIS-H-0505 (1975), and the term "non-conductivity" means that the volume resistivity is more than $10^7$ Ω·cm. As the material of the positive substrate, a metal such as aluminum, titanium, tantalum or stainless steel, or an alloy thereof is used. Among these materials, aluminum and aluminum alloys are preferable from the viewpoint of the balance among electric potential resistance, high conductivity, and cost. Examples of the form of formation of the positive substrate include a foil and a vapor deposition film, and a foil is preferred from the viewpoint of cost. More specifically, an aluminum foil is preferable as the positive substrate. Examples of aluminum and the aluminum alloy include A1085P and A3003P specified in JIS-H-4000 (2014).

The average thickness of the positive substrate is preferably 3 μm or more and 50 μm or less, more preferably 5 μm or more and 40 μm or less, still more preferably 8 μm or more and 30 μm or less, and particularly preferably 10 μm or more and 25 μm or less. By setting the average thickness of the positive substrate to the above range, it is possible to enhance the energy density per volume of the nonaqueous electrolyte energy storage device while increasing the strength of the positive substrate. The average thickness of the positive substrate refers to a value obtained by dividing a cutout mass in cutout of a substrate that has a predetermined area by a true density and a cutout area of the substrate. Hereinafter, the same applies to the average thickness of the negative substrate described later.

The intermediate layer is a coating layer on the surface of the positive substrate, and contains conductive particles such as carbon particles to reduce contact resistance between the positive substrate and the positive active material layer. The configuration of the intermediate layer is not particularly limited, and the intermediate layer can be formed of, for example, a composition containing a resin binder and conductive particles.

The positive active material layer is formed of a so-called positive composite containing a positive active material. The positive composite forming the positive active material layer may contain optional components such as a conductive agent, a binder, a thickener, and a filler and the like as necessary.

The positive active material can be appropriately selected from known positive active materials. As the positive active material for a lithium secondary battery, a material capable of storing and releasing lithium ions is usually used. Examples of the positive active material include lithium-transition metal composite oxides that have an α-$NaFeO_2$-type crystal structure or a spinel-type crystal structure, polyanion compounds, chalcogenides, and sulfur. Examples of the lithium-transition metal composite oxide that has an α-$NaFeO_2$-type crystal structure include $Li[Li_xNi_{1-x}]O_2$ ($0 \leq x < 0.5$), $Li[Li_xNi_\gamma Co_{1-x-\gamma}]O_2$ ($0 \leq x < 0.5$, $0 < \gamma < 1$), $L[Li_xCo_{1-x}]O_2$ ($0 \leq x < 0.5$), $Li[Li_xNi_\gamma Mn_{1-x-\gamma}]O_2$ ($0 \leq x < 0.5$, $0 < \gamma < 1$), $Li[Li_xNi_\gamma MnCo_{1-x-\gamma-\beta}]O_2$ ($0 \leq x < 0.5$, $0 < \gamma$, $0 < \beta$, $0.5 < \gamma+\beta < 1$), and $Li[Li_xNi_\gamma Co_\beta Al_{1-x-\gamma-\beta}]O_2$ ($0 \leq x < 0.5$, $0 < \gamma$, $0 < \beta$, $0.5 < \gamma+\beta < 1$). Examples of the lithium-transition metal composite oxides that have a spinel-type crystal structure include $Li_xMn_2O_4$ and $Li_xNi_\gamma Mn_{2-\gamma}O_4$. Examples of the polyanion compounds include $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. Apart of atoms or polyanions in these materials may be substituted with atoms or anion species composed of other elements. The surfaces of these materials may be coated with other materials. In the positive active material layer, one of these materials may be used singly, or two or more thereof may be used in mixture.

As the positive active material, lithium-transition metal composite oxides that have an α-$NaFeO_2$-type crystal structure or a spinel-type crystal structure, polyanion compounds, and chalcogenides are preferred, lithium-transition metal composite oxides that have an α-$NaFeO_2$-type crystal structure or a spinel-type crystal structure, and polyanion compounds containing nickel, cobalt, or manganese ($LiMnPO_4$, $LiNiPO_4$, $LiCoPO_4$, $Li_2MnSiO_4$, $Li_2CoPO_4F$, and the like) are more preferred, and lithium transition metal composite oxides that have an $\alpha$-$NaFeO_2$-type crystal structure are more preferred. These positive active materials are high in oxidation-reduction potential, and the use of such a positive active material allows the energy density of the nonaqueous electrolyte energy storage device to be increased.

The lithium-transition metal composite oxide that has an $\alpha$-$NaFeO_2$-type crystal structure preferably contains nickel or manganese as a transition metal, and more preferably contains both nickel and manganese. The lithium-transition metal composite oxide may further contain another transition metal such as cobalt. In the lithium-transition metal composite oxide that has an $\alpha$-$NaFeO_2$-type crystal structure, the molar ratio (Li/Me) of lithium (Li) to the transition metal (Me) is preferably more than 1.0, more preferably 1.1 or more, still more preferably 1.2 or more, even more preferably 1.3 or more. The use of such a lithium-transition metal composite oxide allows an increase in electric capacity, for example. The upper limit of the molar ratio (Li/Me) of lithium to the transition metal is preferably 1.6, more preferably 1.5.

As the lithium-transition metal composite oxide that has an $\alpha$-$NaFeO_2$-type crystal structure, a compound represented by the following formula (2) is preferable.

$$Li_{1+\alpha}Me_{1-\alpha}O_2 \quad (2)$$

In the formula (2), Me is a transition metal containing Ni or Mn. The condition of $0\leq\alpha<1$ is met.

Me in the formula (2) preferably contains Ni and Mn. Me is preferably composed substantially of two elements of Ni and Mn or three elements of Ni, Mn, and Co. Me may contain other transition metals.

In the formula (2), the lower limit of the molar ratio (Ni/Me) of Ni to Me is preferably 0.1, more preferably 0.2. In contrast, the upper limit of this molar ratio (Ni/Me) is preferably 0.5, more preferably 0.45. The molar ratio (Ni/Me) within the above-mentioned range improves the energy density and the like of the nonaqueous electrolyte energy storage device.

In the formula (2), the lower limit of the molar ratio (Mn/Me) of Mn to Me is preferably 0.5, more preferably 0.55, still more preferably 0.6. In contrast, the upper limit of this molar ratio (Mn/Me) is preferably 0.75, more preferably 0.7. The molar ratio (Mn/Me) within the above-mentioned range improves the energy density and the like of the nonaqueous electrolyte energy storage device.

In the formula (2), the upper limit of the molar ratio (Co/Me) of Co to Me is preferably 0.3, more preferably 0.2, still more preferably 0.1. The molar ratio (Co/Me) or the lower limit of the molar ratio (Co/Me) may be 0.

In the formula (2), the molar ratio (Li/Me) of Li to Me, that is, $(1+\alpha)/(1-\alpha)$ is preferably more than 1.0 ($\alpha>0$), more preferably 1.1 or more, still more preferably 1.2 or more, even more preferably 1.3. In contrast, the upper limit of this molar ratio (Li/Me) is preferably 1.6, more preferably 1.5. The molar ratio (Li/Me) within the range mentioned above increases the electric capacity.

The lithium-transition metal composite oxide where the molar ratio (Li/Me) of lithium (Li) to the transition metal (Me) is more than 1.0 preferably has no diffraction peak in the range of 20° or more and 22° or less in an X-ray diffraction diagram obtained with the use of a CuKα ray. The lithium-transition metal composite oxide where the molar ratio (Li/Me) of lithium (Li) to the transition metal (Me) is more than 1.0 typically increases in electric capacity through initial charge-discharge until the positive electrode potential reaches, for example, 4.5 V (vs. $Li/Li^+$) or higher. In addition, the diffraction peak in the range of 200 or more and 220 or less before the initial charge-discharge disappears due to the change in crystal structure at the time of such initial charge-discharge. More specifically, the positive active material is high in electric capacity, which is a lithium-transition metal composite oxide with the molar ratio (Li/Me) of lithium (Li) to the transition metal (Me) more than 1.0, and has no diffraction peak in the range of 200 or more and 220 or less in the X-ray diffraction diagram.

A composition ratio of the lithium-transition metal composite oxide in the present specification refers to a composition ratio when a completely discharged state is provided by the following method. First, the nonaqueous electrolyte energy storage device is subjected to constant current charge with a current of 0.05 C until the voltage becomes an end-of-charge voltage under normal usage, so that the energy storage device is brought to a fully charged state. After a 30-minute pause, the nonaqueous electrolyte energy storage device is subjected to constant current discharge with a current of 0.05 C to the lower limit voltage during normal usage. After the battery is disassembled to take out the positive electrode, a test battery using a metal lithium electrode as the counter electrode is assembled, constant current discharge is performed at a current value of 10 mA per 1 g of a positive composite until the positive potential reaches 2.0 V (vs. $Li/Li^+$), the positive electrode is adjusted to the completely discharged state. For the metal lithium electrode in this case, pure-metallic lithium is used instead of a lithium alloy. The battery is disassembled again, and the positive electrode is taken out. A nonaqueous electrolyte attached onto the taken out positive electrode is sufficiently washed with dimethyl carbonate and is dried at room temperature all day and night, and the lithium-transition metal composite oxide of the positive active material is then collected. The collected lithium-transition metal composite oxide is subjected to measurement. Operations from disassembly of the nonaqueous electrolyte energy storage device to collection of the lithium-transition metal composite oxide are performed in an argon atmosphere at a dew point of −60° C. or lower.

The X-ray diffraction measurement for the lithium-transition metal composite oxide is performed for the lithium-transition metal composite oxide in the completely discharged state by the above method. Specifically, the X-ray diffraction measurement is performed by powder X-ray diffraction measurement using an X-diffraction device ("MiniFlex II" from Rigaku Corporation) under conditions such that a CuKα ray is used as a radiation source, a tube voltage is 30 kV, and a tube current is 15 mA. At this time, the diffracted X-ray passes through a KB filter with a thickness of 30 μm and is detected by a high-speed one-dimensional detector (D/teX Ultra 2). A sampling width is 0.02°, a scanning speed is 5°/min, a divergence slit width is 0.625°, a light receiving slit width is 13 mm (OPEN), and a scattering slit width is 8 mm.

The average particle size of the positive active material is preferably 0.1 μm or more and 20 μm or less, for example. By setting the average particle size of the positive active material to be equal to or greater than the above lower limit, the positive active material is easily manufactured or handled. By setting the average particle size of the positive active material to be equal to or less than the above upper limit, the electron conductivity of the positive active material layer is improved. In this regard, the term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher, a classifier, or the like is used to obtain particles of the positive active material in a predetermined shape. Examples of a crushing method include a method in which a mortar, a ball mill, a sand mill, a vibratory ball mill, a planetary ball mill, a jet mill, a counter jet mill, a whirling airflow type jet mill, or a sieve or the like is used. At the time of crushing, wet type crushing in the presence of water or an organic solvent such as hexane can also be used. As a classification method, a sieve or a wind force classifier or the like is used based on the necessity both in dry manner and in wet manner.

The content of the positive active material in the positive active material layer is preferably 70% by mass or more and 98% by mass or less, more preferably 80% by mass or more and 97% by mass or less, further preferably 90% by mass or more and 96% by mass or less. When the content of the positive active material falls within the above range, the energy density of the nonaqueous electrolyte energy storage device can be enhanced.

The conductive agent is not particularly limited so long as it is a material with conductivity. Examples of such a conductive agent include carbonaceous materials; metals; and conductive ceramics. Examples of carbonaceous materials include graphite and carbon black. Examples of the type of the carbon black include furnace black, acetylene black, and ketjen black. Among these, carbonaceous materials are preferable from the viewpoint of conductivity and coatability. In particular, acetylene black and ketjen black are preferable. Examples of the shape of the conductive agent include a powder shape, a sheet shape, and a fibrous shape.

The content of the conductive agent in the positive active material layer is preferably 1% by mass or more and 40% by mass or less, more preferably 2% by mass or more and 10% by mass or less. When the content of the conductive agent falls within the above range, the energy density of the nonaqueous electrolyte energy storage device can be enhanced.

Examples of the binder include: thermoplastic resins such as fluororesin (polytetrafluoroethylene (PTFE), polyvinylidene fluoride (PVDF), etc.), polyethylene, polypropylene, and polyimide; elastomers such as ethylene-propylene-diene rubber (EPDM), sulfonated EPDM, styrene-butadiene rubber (SBR), and fluororubber; and polysaccharide polymers.

The content of the binder in the positive active material layer is preferably 0.5% by mass or more and 10% by mass or less, more preferably 1% by mass or more and 6% by mass or less. When the content of the binder is in the above range, the positive active material can be stably held.

Examples of the thickener include polysaccharide polymers such as carboxymethylcellulose (CMC) and methylcellulose. When the thickener has a functional group that reacts with lithium, it is preferable to deactivate this functional group by methylation and the like in advance. According to an aspect of the present invention, the thickener is preferably not contained in the positive active material layer in some cases.

The filler is not particularly limited. Examples of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof. According to an aspect of the present invention, the filler is preferably not contained in the positive active material layer in some cases.

The positive active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

The average thickness of the positive active material layer is preferably 5 μm or more and 1,000 μm or less, more preferably 10 μm or more and 500 μm or less, still more preferably 50 μm or more and 300 μm or less. The average thickness of the positive active material layer refers to the average value of thicknesses measured at any five points of the positive active material layer.

The lower limit of the capacity density per unit area of the positive active material layer is 5 $mAh/cm^2$, preferably 6 $mAh/cm^2$. The capacity density per unit area of the positive active material layer is equal to or more than the above lower limit, thereby allowing the energy density of the nonaqueous electrolyte energy storage device to be increased, for example. The upper limit of the capacity density per unit area of the positive active material layer may be, for example, 20 $mAh/cm^2$, 15 $mAh/cm^2$, or 10 $mAh/cm^2$. The capacity density per unit area of the positive active material layer can be adjusted by the content of the positive active material in the positive active material layer, the type of the positive active material, the thickness of the positive active material layer, and the like.

(Negative Electrode)

The negative electrode has a negative substrate and a negative active material layer disposed directly or via an intermediate layer on the negative substrate. The intermediate layer of the negative electrode may have the same configuration as the intermediate layer of the positive electrode.

Although the negative substrate may have the same configuration as the positive substrate, metals such as copper, nickel, stainless steel, and nickel-plated steel or alloys thereof, carbonaceous materials, or the like are used as the material, and copper or a copper alloy is preferable. More specifically, the negative substrate is preferably a copper foil. Examples of the copper foil include a rolled copper foil and an electrolytic copper foil.

The average thickness of the negative substrate is preferably 2 μm or more and 35 μm or less, more preferably 3 μm or more and 30 μm or less, still more preferably 4 μm or more and 25 μm or less, and particularly preferably 5 μm or more and 20 μm or less. By setting the average thickness of the negative substrate within the range mentioned above, it is possible to enhance the energy density per volume of the nonaqueous electrolyte energy storage device while increasing the strength of the negative substrate.

The negative active material layer has metal lithium. The metal lithium is a component that functions as a negative active material. The metal lithium may be present as pure-metallic lithium substantially composed of only lithium, or may be present as a lithium alloy containing other metal components. Examples of the lithium alloy include a lithium silver alloy, a lithium zinc alloy, a lithium calcium alloy, a lithium aluminum alloy, a lithium magnesium alloy, and a lithium indium alloy. The lithium alloy may contain multiple metal elements other than lithium.

The negative active material layer may be a layer composed substantially of only metal lithium. The content of metal lithium in the negative active material layer may be 90% by mass or more, may be 99% by mass or more, and may be 100% by mass.

The negative active material layer may be a pure-metallic lithium foil or a lithium alloy foil. The negative active material layer may be a non-porous layer (solid layer). In addition, the negative active material layer may be a porous layer including particles containing metal lithium. The negative active material layer, which is a porous layer including particles containing metal lithium, may further have, for example, resin particles, inorganic particles, and the like.

The negative active material layer, that is, the layer containing metal lithium is preferably a layer that is also present in a discharged state, that is, a layer that is present in all states from a charged state to a discharged state. The average thickness of the negative active material layer in a discharged state is preferably 5 μm or more and 1,000 μm or less, more preferably 10 μm or more and 500 μm or less, still more preferably 30 μm or more and 300 μm or less. The average thickness of the negative active material layer refers to the average value of thicknesses measured at any five points of the negative active material layer. When the negative active material containing metal lithium is also present in a discharged state, preferably with the average thickness thereof equal to or more than the above lower limit, a sufficient amount of metal lithium is present, thus providing advantages such as suppressing a decrease in capacity retention ratio, associated with repeated charge-discharge.

It is to be noted that, for example, in the case of a nonaqueous electrolyte energy storage device configured such that metal lithium is precipitated on at least a part of the negative electrode surface during charge, the metal lithium at the negative electrode surface is substantially all eluted as lithium ions into the nonaqueous electrolyte during discharge, the negative electrode may have no negative active material layer in a discharged state.

(Separator)

The separator can be appropriately selected from known separators. As the separator, for example, a separator composed of only a substrate layer, a separator in which a heat resistant layer containing heat resistant particles and a binder is formed on one surface or both surfaces of the substrate layer, or the like can be used. The substrate layer of the separator may include heat resistant particles. Examples of a material of the substrate layer of the separator include a woven fabric, a nonwoven fabric, and a porous resin film. Among these materials, a porous resin film is preferable from the viewpoint of strength, and a nonwoven fabric is preferable from the viewpoint of liquid retention property of the nonaqueous electrolyte. As the material of the substrate layer of the separator, a polyolefin such as polyethylene or polypropylene is preferable from the viewpoint of a shutdown function, and polyimide, aramid or the like is preferable from the viewpoint of resistance to oxidation and decomposition. As the substrate layer of the separator, a material obtained by combining these resins may be used.

The heat resistant particles included in the heat resistant layer and the substrate layer preferably have a mass loss of 5% or less in the case of heating from room temperature to 500° C. under the atmosphere, and more preferably have a mass loss of 5% or less in the case of heating from room temperature to 800° C. under the atmosphere. Inorganic compounds can be mentioned as materials whose mass loss is less than or equal to a predetermined value when the materials are heated. Examples of the inorganic compound include: oxides such as iron oxide, silicon oxide, aluminum oxide, titanium oxide, zirconium oxide, calcium oxide, strontium oxide, barium oxide, magnesium oxide, and aluminosilicate; hydroxides such as magnesium hydroxide, calcium hydroxide, and aluminum hydroxide; nitrides such as aluminum nitride and silicon nitride; carbonates such as calcium carbonate; sulfates such as barium sulfate; hardly soluble ionic crystals such as calcium fluoride, barium fluoride, and barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compounds, a simple substance or a complex of these substances may be used alone, or two or more thereof may be used in mixture. Among these inorganic compounds, silicon oxide, aluminum oxide, or aluminosilicate is preferable from the viewpoint of safety of the nonaqueous electrolyte energy storage device.

The porosity of the separator is preferably 80% by volume or less from the viewpoint of strength, and is preferably 20% by volume or more from the viewpoint of discharge performance. The term "porosity" herein is a volume-based value, and means a value measured with a mercury porosimeter.

The average thickness of the separator is preferably 10 μm or more and 40 μm or less. The lower limit of the average thickness of the separator is more preferably 15 μm, and may be still more preferably 20 μm or 25 μm in some cases. In contrast, the upper limit of the average thickness of the separator is preferably 30 μm, and may be 25 μm. The average thickness of the separator is equal to or more than the above lower limit, thereby allowing any short circuit associated with repeated charge-discharge to be further suppressed. In contrast, the average thickness of the separator is set to be equal to or less than the above upper limit, thereby allowing the energy density per volume of the nonaqueous electrolyte energy storage device to be increased, for example. The average thickness of the separator refers to the average value of thicknesses measured at any five points of the separator.

The separator preferably has a resin coating layer provided on one or both outermost layers. Examples of the resin mentioned above include the examples provided as the binder for the positive active material layer, and fluororesins such as PVDF are preferable. The average thickness of one coating layer may be, for example, 0.1 μm or more and 3 μm or less. The average thickness of the coating layer refers to a value obtained by subtracting, from the average thickness of the separator, the average value of thicknesses measured at any five points of the separator from which the coating layer is removed. Providing such a covering layer enhances the oxidation resistance and the like of the separator, thereby improving the coulombic efficiency, capacity retention ratio, and the like of the nonaqueous electrolyte energy storage device.

As the separator, a polymer gel composed of a polymer and a nonaqueous electrolyte may be used. Examples of the polymer include polyalkyl methacrylates such as a polyacrylonitrile, a polyethylene oxide, a polypropylene oxide, a polyethylene carbonate, a polypropylene carbonate, a polyvinyl carbonate, and a polymethyl methacrylate, polyalkyl acrylates such as a polymethyl acrylate, copolymers of monomers constituting the polymers, such as a polyvinyl ethylene carbonate, a polyvinyl acetate, a polyvinyl pyrrolidone, a polymaleic acid and derivatives thereof, a polyvinylidene fluoride, a poly(vinylidene fluoride-co-hexafluoropropylene), and polytetrafluoroethylene, and mixtures of the polymers. These polymers may be combined with an inorganic salt or an ionic liquid. The use of the polymer gel has the effect of suppressing liquid leakage. As the separator, a polymer gel may be used in combination with a porous resin film, a nonwoven fabric, or the like as described above.

(Nonaqueous Electrolyte)

The nonaqueous electrolyte includes an ionic liquid and a fluorinated ether as a nonaqueous solvent. The nonaqueous electrolyte typically further includes a lithium salt. It is to be noted that the ionic liquid is not included in the nonaqueous solvent. In other words, typically, the nonaqueous electrolyte includes an ionic liquid, a nonaqueous solvent, and a lithium salt, and as the nonaqueous solvent, includes at least a fluorinated ether. The nonaqueous solvent may be composed of only a fluorinated ether, or may further contain other nonaqueous solvents besides the fluorinated ether. The nonaqueous electrolyte may further contain other components besides the ionic liquid, the nonaqueous solvent, and the lithium salt. Examples of the other components include additives.

(Ionic Liquid)

The ionic liquid refers to an ionic compound at least partially in a liquid state at ordinary temperature (20° C.). The ionic liquid preferably mainly contains an ionic liquid including no ether group. The ether group is a group represented by —$R^a$—O—$R^b$ ($R^a$ is a divalent hydrocarbon group. $R^b$ is a monovalent hydrocarbon group. Some or all of the hydrogen atoms of the divalent hydrocarbon group mentioned above and some or all of the hydrogen atoms of the monovalent hydrocarbon group may be substituted with another group or atom.).

The content of the ionic liquid including no ether group with respect to all of the ionic liquids included in the nonaqueous electrolyte is preferably 70% by volume or more, preferably 80% by volume or more, more preferably 90% by volume or more, still more preferably 99% by volume or more, particularly preferably 100% by volume. When the ionic liquid mainly contains an ionic liquid including no ether group, particularly when the ionic liquid is substantially composed only of an ionic liquid including no ether group, the oxidation resistance of the nonaqueous electrolyte is particularly enhanced, and any short circuit in the case of repeated charge-discharge is further suppressed.

Examples of the cations constituting the ionic liquid include an ammonium cation (quaternary ammonium cation), a phosphonium cation (quaternary phosphonium cation), and a sulfonium cation (tertiary sulfonium cation).

Examples of the ammonium cation include an imidazolium cation, a tetraalkylammonium cation, a pyridinium cation, a pyrrolium cation, a pyrazolium cation, a pyrrolinium cation, a pyrrolidinium cation, and a piperidinium cation.

Examples of the imidazolium cation include a 1,3-dimethylimidazolium ion, a 1-ethyl-3-methylimidazolium ion, a 1,3-diethylimidazolium ion, a 1-butyl-3-methylimidazolium ion, a 1,2,3-trimethylimidazolium ion, a 1,2-dimethyl-3-ethylimidazolium ion, a 1,2-dimethyl-3-propylimidazolium ion, a 1-butyl-2,3-dimethylimidazolium ion, a 1-methoxymethyl-3-methylimidazolium ion, a 1-(2-methoxyethyl)-3-methylimidazolium ion, a 1-(3-methoxypropyl)-3-methylimidazolium ion, a 1-methoxymethyl-3-ethylimidazolium ion, a 1-(2-methoxyethyl)-3-ethylimidazolium ion, and a 1-(3-methoxypropyl)-3-ethylimidazolium ion. Among these examples, a 1,3-dimethylimidazolium ion, a 1-ethyl-3-methylimidazolium ion, a 1,3-diethylimidazolium ion, a 1-butyl-3-methylimidazolium ion, a 1,2,3-trimethylimidazolium ion, a 1,2-dimethyl-3-ethylimidazolium ion, a 1,2-dimethyl-3-propylimidazolium ion, and a 1-butyl-2,3-dimethylimidazolium ion are preferable from the viewpoint of further suppressing any short circuit.

Examples of the tetraalkylammonium cation include a trimethylethylammonium ion, a trimethylpropylammonium ion, a trimethylhexylammonium ion, a tetrapentylammonium ion, a trimethyl(methoxymethyl)ammonium ion, a trimethyl(2-methoxyethyl)ammonium ion, a trimethyl(3-methoxypropyl)ammonium ion, a diethyl(methoxymethyl)methylammonium ion, a diethyl(2-methoxyethyl)methylammonium ion, and a diethyl(3-methoxypropyl)methylammonium ion. Among these examples, a trimethylethylammonium ion, a trimethylpropylammonium ion, a trimethylhexylammonium ion, and a tetrapentylammonium ion are preferable from the viewpoint of further suppressing any short circuit.

Examples of the pyridinium cation include an N-methylpyridinium ion, an N-ethylpyridinium ion, an N-propylpyridinium ion, an N-butylpyridinium ion, a 1-ethyl-2-methylpyridinium ion, a 1-butyl-4-methylpyridinium ion, a 1-butyl-2,4-dimethylpyridinium ion, an N-methoxymethylpyridinium ion, an N-(2-methoxyethyl)pyridinium ion, and an N-(3-methoxypropyl)pyridinium ion. Among these examples, an N-methylpyridinium ion, an N-ethylpyridinium ion, an N-propylpyridinium ion, an N-butylpyridinium ion, a 1-ethyl-2-methylpyridinium ion, a 1-butyl-4-methylpyridinium ion, and a 1-butyl-2,4-dimethylpyridinium ion are preferable from the viewpoint of further suppressing any short circuit.

Examples of the pyrrolium cation include a 1,1-dimethylpyrrolium ion, a 1-ethyl-1-methylpyrrolium ion, a 1-methyl-1-propylpyrrolium ion, a 1-butyl-1-methylpyrrolium ion, a 1-methoxymethyl-1-methylpyrrolium ion, a 1-(2-methoxyethyl)-1-methylpyrrolium ion, a 1-(3-methoxypropyl)-1-methylpyrrolium ion, a 1-methoxymethyl-2-methylpyrazolium ion, a 1-(2-methoxyethyl)-2-methylpyrazolium ion, and a 1-(3-methoxypropyl)-2-methylpyrazolium ion. Among these examples, a 1,1-dimethylpyrrolium ion, a 1-ethyl-1-methylpyrrolium ion, a 1-methyl-1-propylpyrrolium ion, and a 1-butyl-1-methylpyrrolium ion are preferable from the viewpoint of further suppressing any short circuit.

Examples of the pyrazolium cation include a 1,2-dimethylpyrazolium ion, a 1-ethyl-2-methylpyrazolium ion, a 1-propyl-2-methylpyrazolium ion, and a 1-butyl-2-methylpyrazolium ion.

Examples of the pyrrolinium cation include a 1,2-dimethylpyrrolinium ion, a 1-ethyl-2-methylpyrrolinium ion, a 1-propyl-2-methylpyrrolinium ion, a 1-butyl-2-methylpyrrolinium ion, a 1-methoxymethyl-2-methylpyrrolinium ion, a 1-(2-methoxyethyl)-2-methylpyrrolinium ion, and a 1-(3-methoxypropyl)-2-methylpyrrolinium ion. Among these examples, a 1,2-dimethylpyrrolinium ion, a 1-ethyl-2-methylpyrrolinium ion, a 1-propyl-2-methylpyrrolinium ion, and a 1-butyl-2-methylpyrrolinium ion are preferable from the viewpoint of further suppressing any short circuit.

Examples of the pyrrolidinium cation include a 1,1-dimethylpyrrolidinium ion, a 1-ethyl-1-methylpyrrolidinium ion, a 1-methyl-1-propylpyrrolidinium ion, a 1-butyl-1-methylpyrrolidinium ion, a 1-methoxymethyl-1-methylpyrrolidinium ion, a 1-(2-methoxyethyl)-1-methylpyrrolidinium ion, and a 1-(3-methoxypropyl)-1-methylpyrrolidinium ion. Among these examples, a 1,1-dimethylpyrrolidinium ion, a 1-ethyl-1-methylpyrrolidinium ion, a 1-methyl-1-propylpyrrolidinium ion, and a 1-butyl-1-methylpyrrolidinium ion are preferable from the viewpoint of further suppressing any short circuit.

Examples of the piperidinium cation include a 1,1-dimethylpiperidinium ion, a 1-ethyl-1-methylpiperidinium ion, a 1-methyl-1-propylpiperidinium ion, a 1-butyl-1-methylpiperidinium ion, a 1-methoxymethyl-1-methylpiperidinium ion, a 1-(2-methoxyethyl)-1-methylpiperidinium ion, and a 1-(3-methoxypropyl)-1-methylpiperidinium ion. Among these examples, a 1,1-dimethylpiperidinium ion, a 1-ethyl-1-methylpiperidinium ion, a 1-methyl-1-propylpiperidinium ion, and a 1-butyl-1-methylpiperidinium ion are preferable from the viewpoint of further suppressing any short circuit.

Examples of the phosphonium cation include a cation represented by the following formula (3), which is an example of a cation including no ether group.

$$PR_4^+ \quad (3)$$

In the formula (3), the groups R each independently represent a monovalent hydrocarbon group.

The R mentioned above is preferably an aliphatic hydrocarbon group, more preferably an alkyl group. The number of carbon atoms in R is preferably one or more and eight or less, more preferably one or more and four or less.

Examples of the phosphonium cation include a tetramethylphosphonium ion, a tetraethylphosphonium ion, a trimethylethylphosphonium ion, a trimethylpropylphosphonium ion, a tetraphenylphosphonium ion, and a trimethylmethoxymethylphosphonium ion. Among these examples, a tetramethylphosphonium ion, a tetraethylphosphonium ion, a trimethylethylphosphonium ion, a trimethylpropylphosphonium ion, and a tetraphenylphosphonium ion are preferable from the viewpoint of further suppressing any short circuit.

Examples of the sulfonium cation include a trimethylsulfonium ion, a triethylsulfonium ion, and a tributylsulfonium ion.

The cations constituting the ionic liquid are preferably ammonium cations or phosphonium cations. In addition, the cations constituting the ionic liquid preferably have no ether group. As cations constituting the ionic liquid including no ether group, a cation composed of: at least one of a phosphorus atom, a nitrogen atom, and a sulfur atom; a carbon atom; and a hydrogen atom is preferable, and a cation composed of a phosphorus atom, a carbon atom, and a hydrogen atom may be more preferable. Among the ammonium cations, a pyrrolidinium cation is more preferable. Among the phosphonium cations, a cation represented by the formula (3) mentioned above is more preferable. One, or two or more types of these cations may be contained.

Examples of the anions constituting the ionic liquid include $PF_6^-$, $PO_2F_2^-$, $BF_4^-$, $ClO_4^-$, $NO_2^-$, $NO_3^-$, $I^-$, $SO_3CF_3^-$, $C(SO_2CF_3)_3^-$, $C(SO_2C_2F_5)_3^-$, $N(SO_2F)_2^-$(bis(fluorosulfonyl)imide anion), $N(CF_3SO_2)_2^-$(bis(trifluoromethanesulfonyl)imide anion), $N(C_2F_5SO_2)_2^-$(bis(pentafluoroethanesulfonyl)imide anion), $N(C_4F_9SO_2)_2^-$(bis(nonafluorobutanesulfonyl)imide anion), $N(POF_2)_2^-$(bis(difluorophosphonyl)imide anion), $N(CF_3SO_2)(CF_3CO)^-$((trifluoromethanesulfonyl)(trifluoromethanecarbonyl)imide anion), $N(CN)_2^-$(dicyanoimide anion), $CF_3—SO_2—N—SO_2—N—SO_2CF_3^-$, $FSO_2—N—SO_2—C_4F_9^-$, $CF_3^-SO_2—N—SO_2—C_4F_9^-$, $CF_3—SO_2—N—SO_2—CF_2—SO_2—N—SO_2—CF_3^{2-}$, $CF_3—SO_2—N—SO_2—CF_2—SO_3^{2-}$, and $CF_3—SO_2—N—SO_2—CF_2—SO_2—C(—SO_2CF_3)_2^{2-}$.

The anions constituting the ionic liquid are preferably imide anions, more preferably $N(SO_2F)_2^-$(bis(fluorosulfonyl)imide anions). When the anions constituting the ionic liquid are such anions, the ionic conductivity of the nonaqueous electrolyte is increased, thereby allowing the coulombic efficiency of the nonaqueous electrolyte energy storage device to be further enhanced. In addition, the anions constituting the ionic liquid preferably have a fluorine atom. In addition, the anions constituting the ionic liquid preferably have no ether group. One, or two or more types of these anions may be contained.

(Fluorinated Ether)

The fluorinated ether is a compound in which some or all of hydrogen atoms of an ether are substituted with fluorine atoms. The fluorinated ether preferably has one or two ether groups, more preferably has only one ether group. One, or two or more fluorinated ethers can be used.

The number of fluorine atoms in the fluorinated ether is preferably one or more and ten or less, more preferably two or more and six or less, still more preferably three or more and five or less. When the number of fluorine atoms in the fluorinated ether falls within the range mentioned above, any short circuit associated with repeated charge-discharge can be further suppressed. In addition, the number of fluorine atoms in the fluorinated ether may be preferably four or more and ten or less, more preferably six or more and eight or less in some cases, from the viewpoint of increasing the capacity retention ratio of the nonaqueous electrolyte energy storage device. The number of carbon atoms in the fluorinated ether may be, for example, two or more and twelve or less, but is preferably two or more and eight or less, more preferably four or more and six or less.

The ratio (F/(H+F)) of the number of fluorine atoms to the total of the number of hydrogen atoms and the number of fluorine atoms in the fluorinated ether may be, for example, 5% or more and 95% or less, but is preferably 10% or more and 50% or less, more preferably 20% or more and 45% or less. When the ratio (F/(H+F)) of the number of fluorine atoms to the total of the number of hydrogen atoms and the number of fluorine atoms in the fluorinated ether falls within the range mentioned above, occurrence of a short circuit associated with repeated charge-discharge can be further suppressed. In addition, the ratio (F/(H+F)) of the number of fluorine atoms to the total of the number of hydrogen atoms and the number of fluorine atoms in the fluorinated ether may be preferably 40% or more and 90% or less, more preferably 50% or more and 80% or less in some cases, from the viewpoint of increasing the capacity retention ratio of the nonaqueous electrolyte energy storage device.

The fluorinated ether may be a cyclic fluorinated ether or a chain fluorinated ether, but is preferably a chain fluorinated ether. Examples of the fluorinated ether include a compound represented by the following formula (1).

$$R^1—O—R^2 \quad (1)$$

In the formula (1), $R^1$ is a fluorinated hydrocarbon group. $R^2$ is a hydrocarbon group or a fluorinated hydrocarbon group. Alternatively, $R^1$ and $R^2$ may be bonded to each other to form a divalent fluorinated hydrocarbon group.

The $R^1$ mentioned above is preferably a fluorinated alkyl group. The upper limit of the number of carbon atoms in $R^1$ is preferably eight, more preferably five, still more preferably three, and even more preferably two. The lower limit of the number of carbon atoms in $R^1$ may be one, but is preferably two.

The $R^2$ mentioned above is preferably a hydrocarbon group, more preferably an alkyl group. In addition, $R^2$ may be preferably an alkyl group or a fluorinated alkyl group in some cases. The upper limit of the number of carbon atoms in $R^2$ is preferably eight, more preferably five, still more preferably three, even more preferably two. The lower limit of the number of carbon atoms in $R^2$ may be one, but is preferably two.

The upper limit of the total number of carbon atoms in $R^1$ and $R^2$ mentioned above is preferably sixteen, more preferably eight, still more preferably six, even more preferably five, even more preferably four. In contrast, the lower limit of the total number of carbon atoms may be two, but is preferably three, more preferably four. The upper limit of the total number of fluorine atoms in $R^1$ and $R^2$ mentioned above is preferably fifteen, more preferably ten, still more preferably six, even more preferably five. In contrast, the lower limit of the total number of fluorine atoms is preferably two, more preferably four, and may be six. The use of the fluorinated ether with the number of carbon atoms and the number of fluorine atoms as described above favors the viscosity, oxidation resistance, ionic conductivity, and the like of the nonaqueous electrolyte, thereby allowing for, for example, further suppressing any short circuit associated with repeated charge-discharge for the nonaqueous electrolyte energy storage device, and further enhancing the coulombic efficiency.

Specific examples of the fluorinated ether include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$, $H(CF_2)_2CH_2OCF_2CHFCF_3$, $F(CF_2)_2CH_2OCF_2CHFCF_3$, $H(CF_2)_4CH_2O(CF_2)H$, $CF_3OCH_2(CF_2)_2F$, $CF_3CHFCF_2OCH_2(CF_2)_3F$, $CH_3CF_2OCH_2(CF_2)_2F$, $CH_3CF_2OCH_2(CF_2)_3F$, $CH_3O(CF_2)_5F$, $F(CF_2)_3CH_2OCH_2(CF_2)_3F$, $F(CF_2)_2CH_2OCH_2(CF_2)_2F$, $H(CF_2)_2CH_2OCH_2(CF_2)_2H$, and $CH_3CF_2OCH_2(CF_2)_2H$.

The content ratio between the ionic liquid and the fluorinated ether (ionic liquid:fluorinated ether) preferably falls within the range of 50:50 to 90:10, more preferably within the range of 60:40 to 80:20 in terms of molar ratio (amount-of-substance ratio). The content ratio between the ionic liquid and the fluorinated ether within the range mentioned above allows for, for example, further suppressing any short circuit associated with repeated charge-discharge and further enhancing the coulombic efficiency.

(Other Nonaqueous Solvents Besides Fluorinated Ether)

Examples of the other nonaqueous solvents besides the fluorinated ether include cyclic carbonate, chain carbonate, ester, amide, sulfone, lactone, and nitrile. Some or all of the hydrogen atoms of these nonaqueous solvents may be substituted with other groups or atoms (for example, fluorine atoms). The content of the fluorinated ether in all of the nonaqueous solvents included in the nonaqueous electrolyte is, however, preferably 90% by volume or more, more preferably 99% by volume or more. Alternatively, the content of the nonaqueous solvents besides the fluorinated ether is preferably 10% by volume or less, more preferably 1% by volume or less with respect to the fluorinated ether, and it is particularly preferable to use substantially only the fluorinated ether as the nonaqueous solvent. In such a case, for example, any short circuit associated with repeated charge-discharge can be further suppressed, and further enhance the coulombic efficiency can be further enhanced.

(Lithium Salt)

Examples of the lithium salt include salts of anions and lithium ions constituting the ionic liquid described above. Among the lithium salts, a lithium imide salt is preferable, and $LiN(SO_2F)_2$ (lithium bis(fluorosulfonyl)imide: LiFSI) is more preferable. The use of such a lithium salt allows for, for example, further suppressing any short circuit associated with repeated charge-discharge and further enhancing the coulombic efficiency.

In addition, the anions present in the nonaqueous electrolyte are preferably substantially only imide anions, and preferably substantially only bis(fluorosulfonyl)imide anions. For example, the content rate of imide anions or bis(fluorosulfonyl)imide anions to all of the anions in the nonaqueous electrolyte is preferably 90 mol % or more, more preferably 99 mol % or more, still more preferably 99.9 mol % or more. The anions in the nonaqueous electrolyte have a such a composition, thereby allowing for, for example, further suppressing any short circuit associated with repeated charge-discharge and further enhancing the coulombic efficiency.

The content of the lithium salt in the nonaqueous electrolyte is preferably 0.1 mol/$dm^3$ or more and 3.0 mol/$dm^3$ or less, more preferably 0.1 mol/$dm^3$ or more and less than 2.6 mol/$dm^3$, still more preferably 0.3 mol/$dm^3$ or more and 2.5 mol/$dm^3$ or less. The lower limit of the content of the lithium salt in the nonaqueous electrolyte is still more preferably 0.5 mol/$dm^3$, even more preferably 1.0 mol/$dm^3$, even more preferably 1.5 mol/$km^3$, and may be even more preferably 2.0 mol/$dm^3$ in some cases. The upper limit of the content of the lithium salt in the nonaqueous electrolyte may be preferably 2.2 mol/$dm^3$ or 2.0 mol/$dm^3$ in some cases. The content of the lithium salt within the range mentioned above allows the ionic conductivity of the nonaqueous electrolyte to be increased, for example. In particular, the content of the lithium salt in the nonaqueous electrolyte is set to be equal to or more than the above lower limit, thereby allowing performances related to charge-discharge cycles to be enhanced, such as further suppressing any short circuit associated with repeated charge-discharge.

The total content of the ionic liquid, fluorinated ether, and lithium salt in the nonaqueous electrolyte is preferably 90% by mass or more, and may be more preferably 99% by mass or more, still more preferably 99.9% by mass or more in some cases, with respect to the whole nonaqueous electrolyte. In such a case, there is a tendency for any short circuit associated with repeated charge-discharge to be further suppressed.

(Additive)

Examples of the additives, which may be included in the nonaqueous electrolyte, include aromatic compounds such as biphenyl, alkylbiphenyl, terphenyl, partly hydrogenated terphenyl, cyclohexylbenzene, t-butylbenzene, t-amylbenzene, and dibenzofuran; partial halides of the aromatic compounds such as 2-fluorobiphenyl, o-cyclohexylfluorobenzene, and p-cyclohexylfluorobenzene; succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, dimethyl sulfate, ethylene sulfate, sulfolane, dimethyl sulfone, diethyl sulfone, dimethylsulfoxide, diethylsulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tris(tristrimethylsilyl) phosphite, tris(tristrimethylsilyl)phosphate, and tetrakistrimethylsilyl titanate. One of these additives may be used, or two or more thereof may be used in mixture.

The content of the additive contained in the nonaqueous electrolyte is preferably 0.01% by mass or more and 10% by mass or less, more preferably 0.1% by mass or more and 7% by mass or less, further preferably 0.2% by mass or more and 5% by mass or less, and particularly preferably 0.3% by mass or more and 3% by mass or less, with respect to the total nonaqueous electrolyte. When the content of the additive falls within the above range, it is possible to improve capacity retention performance or charge-discharge cycle performance after high-temperature storage, and to further improve safety.

In the nonaqueous electrolyte energy storage device, the positive electrode potential at the end-of-charge voltage under normal usage is preferably 3.5 V (vs. $Li/Li^+$) or higher, more preferably 4.0 V (vs. $Li/Li^+$) or higher, and may be still more preferably 4.2 V (vs. $Li/Li^+$) or higher, 4.3 V (vs. $Li/Li^+$) or higher, 4.4 V (vs. $Li/Li^+$) or higher, or 4.5 V (vs. $Li/Li^+$) or higher. The positive electrode potential at the end-of-charge voltage under normal usage is set to be equal to or more than the above lower limit, thereby allowing the discharge capacity to be increased, and allowing the energy density to be increased.

The upper limit of the positive electrode potential at the end-of-charge voltage under normal usage of the nonaqueous electrolyte energy storage device is, for example, 5.0 V (vs. $Li/Li^+$), and may be 4.8 V (vs. $Li/Li^+$), 4.7 V (vs. $Li/Li^+$), or 4.6 V (vs. $Li/Li^+$).

In the nonaqueous electrolyte energy storage device according to the present embodiment, the electrode assembly may have a load applied in the thickness direction. When a load is applied to the electrode assembly, the charge-discharge performance typically tends to be enhanced, while the distance between the electrodes is shortened, thus making a short circuit associated with repeated charge-discharge more likely to be caused in some cases. For this reason, an embodiment of the present invention is applied to a nonaqueous electrolyte energy storage device in which an electrode assembly has a load applied in the thickness direction, thereby making it possible to particularly effectively enjoy the advantage of being capable of suppressing any short circuit associated with repeated charge-discharge. The load can be applied to the electrode assembly (the electrode assembly can be pressurized) by, for example, a pressurizing member that pressurizes the case from the outside. The pressurizing member may be a restraining member that restrains the shape of the case. The pressurizing member (restraining member) is provided so as to sandwich and then pressurize the electrode assembly from both surfaces in the thickness direction via the case, for example. The surfaces of the electrode assembly to be pressurized have contact with the inner surface of the case directly or with another member interposed therebetween. Thus, the electrode assembly is pressurized by pressurizing the case. Examples of the pressurizing member include a restraining band or a metallic frame. For example, a metallic frame may be configured to apply an adjustable load with a bolt or the like. In addition, a plurality of nonaqueous electrolyte energy storage devices may be arranged side by side in the thickness direction of the electrode assembly, and fixed with the use of a frame or the like with the plurality of nonaqueous electrolyte energy storage devices pressurized from both ends in the thickness direction.

The shape of the nonaqueous electrolyte energy storage device according to the present embodiment is not particularly limited, and examples thereof include cylindrical batteries, prismatic batteries, flat batteries, coin batteries and button batteries.

FIG. 1 shows a nonaqueous electrolyte energy storage device 1 as an example of a prismatic battery. FIG. 1 is a view showing an inside of a case in a perspective manner. An electrode assembly 2 including a positive electrode and a negative electrode which are wound with a separator interposed therebetween is housed in a prismatic case 3. The positive electrode is electrically connected to a positive electrode terminal 4 via a positive electrode lead 41. The negative electrode is electrically connected to a negative electrode terminal 5 via a negative electrode lead 51.

A nonaqueous electrolyte energy storage device according to another embodiment of the present invention is a nonaqueous electrolyte energy storage device including: a positive electrode; a negative electrode including metallic lithium; and a nonaqueous electrolyte including an ionic liquid, where the positive electrode potential at an end-of-charge voltage under normal usage is higher than 4.2 V (vs. $Li/Li^+$), and the ionic liquid mainly contains an ionic liquid including no ether group. The specific form and suitable form of the nonaqueous electrolyte energy storage device according to the present embodiment are the same as the specific form and suitable form of the above-mentioned nonaqueous electrolyte energy storage device according to an embodiment of the present invention. In the nonaqueous electrolyte energy storage device according to the present embodiment, the positive electrode may have no positive active material layer of 5 $mAh/cm^2$ or more in capacity density per unit area. The positive electrode, however, preferably includes a positive active material layer of 5 $mAh/cm^2$ or more in capacity density per unit area. In addition, the nonaqueous electrolyte may contain no fluorinated ether. The nonaqueous electrolyte, however, preferably includes a fluorinated solvent (fluorinated ether, fluorinated ester, fluorinated carbonate, etc.), more preferably includes a fluorinated ether.

In the nonaqueous electrolyte energy storage device according to each embodiment of the present invention, the nonaqueous electrolyte is preferably not the following electrolyte solution A. The electrolyte solution A includes a lithium salt, an ionic liquid, and a phosphoric acid ester derivative, the concentration of the lithium salt is 2.6 mol/$dm^3$ or more, the ionic liquid includes a cation component and an anion component, the cation contains at least one of a pyrrolidinium cation represented by the following formula (i) and a piperidinium cation represented by the following formula (ii), and the proportion of the phosphoric acid ester derivative in the electrolyte solution A is 15% by volume or more and 90% by volume or less. The use of a nonaqueous electrolyte other than the electrolyte solution A further suppresses any short circuit associated with repeated charge-discharge.

[Chemical Formula 1]

(i)

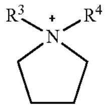

(ii)

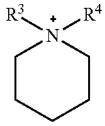

In the formulas (i) and (ii), $R^3$ and $R^4$ each independently represent a linear or branched alkyl group, alkenyl group, alkynyl group, or alkylene alkoxy group having one to five carbon atoms.

<Method for Using Nonaqueous Electrolyte Energy Storage Device>

A method for using a nonaqueous electrolyte energy storage device according to an embodiment of the present invention includes: charging the nonaqueous electrolyte energy storage device such that a positive electrode potential exceeds 4.2 V (vs. $Li/Li^+$), the nonaqueous electrolyte energy storage device includes a positive electrode, a negative electrode containing metal lithium, and a nonaqueous electrolyte including an ionic liquid, and the ionic liquid mainly contains an ionic liquid including no ether group.

Specific examples of the nonaqueous electrolyte energy storage device for use in the method for using include the nonaqueous electrolyte energy storage device according to each embodiment of the present invention described above. The method for using may be the same as a conventionally known method for using a nonaqueous electrolyte energy storage device, except that a predetermined nonaqueous electrolyte energy storage device is charged such that the positive electrode potential exceeds 4.2 V (vs. $Li/Li^+$).

The positive electrode potential at the end-of-charge voltage at the time of the charge mentioned above is higher than 4.2 V (vs. $Li/Li^+$), preferably 4.3 V (vs. $Li/Li^+$) or higher, more preferably 4.4 V (vs. $Li/Li^+$) or higher, still more preferably 4.5 V (vs. $Li/Li^+$) or higher, yet more preferably 4.6 V (vs. $Li/Li^+$) or higher. The upper limit of the positive electrode potential is, for example, 5.0 V (vs. $Li/Li^+$), and may be 4.8 V (vs. $Li/Li^+$) or 4.7 V (vs. $Li/Li^+$).

<Nonaqueous Electrolyte Energy Storage Apparatus>

The nonaqueous electrolyte energy storage device according to the present embodiment can be mounted as an energy storage unit (battery module) configured by assembling a plurality of nonaqueous electrolyte energy storage devices on a power source for automobiles such as electric vehicles (EV), hybrid vehicles (HEV), and plug-in hybrid vehicles (PHEV), a power source for electronic devices such as personal computers and communication terminals, or a power source for power storage, or the like. In this case, the technique according to one embodiment of the present invention may be applied to at least one nonaqueous electrolyte energy storage device included in the energy storage unit.

Figure 2:
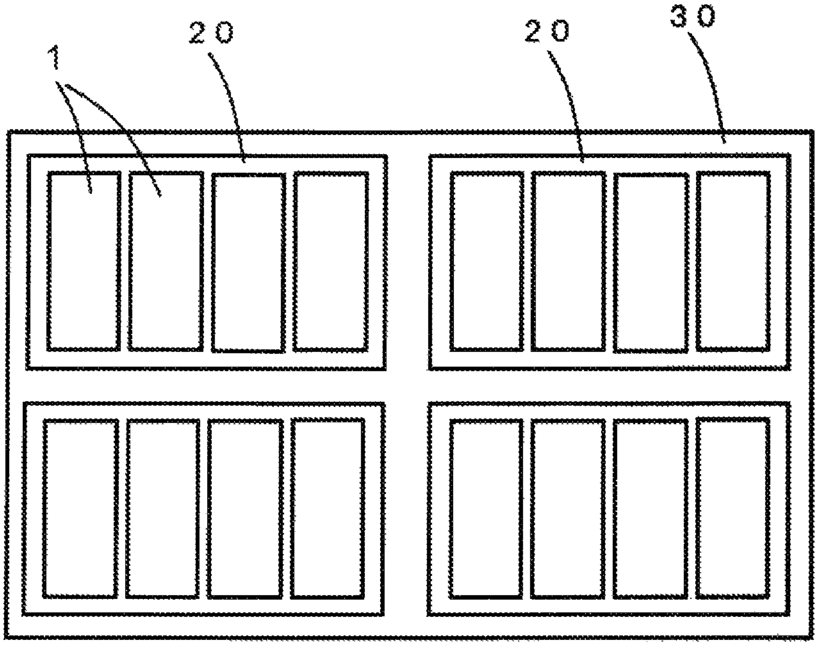
FIG. 2 is a schematic diagram showing an energy storage apparatus including a plurality of the nonaqueous electrolyte energy storage devices according to one embodiment of the present invention.

FIG. 2 shows an example of an energy storage apparatus 30 formed by assembling energy storage units 20 in each of which two or more electrically connected nonaqueous electrolyte energy storage devices 1 are assembled. The energy storage apparatus 30 may include a busbar (not illustrated) for electrically connecting two or more nonaqueous electrolyte energy storage devices 1 and a busbar (not illustrated) for electrically connecting two or more energy storage units 20. The energy storage unit 20 or the energy storage apparatus 30 may include a state monitor (not illustrated) that monitors the state of one or more nonaqueous electrolyte energy storage devices.

<Method for Manufacturing Nonaqueous Electrolyte Energy Storage Device>

A method for manufacturing a nonaqueous electrolyte energy storage device according to an embodiment of the present invention includes: preparing a positive electrode including a positive active material layer of 5 $mAh/cm^2$ or more in capacity density per unit area; preparing a negative electrode including metal lithium, or a surface region capable of depositing metal lithium during charge; and preparing a nonaqueous electrolyte including an ionic liquid and a fluorinated ether.

A method for manufacturing a nonaqueous electrolyte energy storage device according to another embodiment of the present invention is a method for manufacturing a nonaqueous electrolyte energy storage device, including: preparing a positive electrode; preparing a negative electrode including metal lithium, or a surface region capable of depositing metal lithium during charge; and preparing a nonaqueous electrolyte including an ionic liquid, where the ionic liquid mainly contains an ionic liquid including no ether group, and the positive electrode potential at an end-of-charge voltage under normal usage is higher than 4.2 V (vs. $Li/Li^+$).

Preparing the positive electrode may be fabricating the positive electrode. The positive electrode can be fabricated, for example, by applying a paste-like positive composite (positive composite paste) to a positive substrate directly or via an intermediate layer and drying the composite to form a positive active material layer. The capacity density per unit area of the positive active material layer can be adjusted by the content of the positive active material in the positive active material layer, the type of the positive active material, the thickness of the positive active material layer (the amount of the positive composite paste applied), and the like.

Preparing the negative electrode may be fabricating the negative electrode. The negative electrode to be prepared is a negative electrode including metal lithium or a negative electrode including a surface region capable of depositing metal lithium during charge. The negative electrode containing metal lithium can be fabricated by laminating a negative active material layer containing metal lithium directly on a negative substrate or over the substrate with an intermediate layer interposed therebetween, and pressing or the like. The negative active material layer containing metal lithium may be a pure-metallic lithium foil or a lithium alloy foil. The negative electrode that has a surface region capable of precipitating metal lithium during charge may be, for example, a negative electrode composed of only a negative substrate. In the case of preparing the negative electrode hat has a surface region capable of precipitating metal lithium during charge, a positive electrode including a positive active material containing lithium ions is prepared in advance for the positive electrode.

Preparing the nonaqueous electrolyte may be preparing a nonaqueous electrolyte. The nonaqueous electrolyte can be prepared by, for example, mixing respective components constituting the nonaqueous electrolyte. For a specific form of and a suitable form of the nonaqueous electrolyte to be prepared, the above-described form can be applied as the nonaqueous electrolyte provided in the nonaqueous electrolyte energy storage device.

The method for manufacturing the nonaqueous electrolyte energy storage device additionally includes, for example, preparing a separator, forming an electrode assembly in which the positive electrode and the negative electrode are alternately superposed by stacking or winding the positive electrode and the negative electrode with the separator interposed between the electrodes, housing the positive electrode and the negative electrode (electrode assembly) in a case, and injecting the nonaqueous electrolyte into the case. The nonaqueous electrolyte energy storage device can be obtained by sealing an injection port after the injection.

The method for manufacturing the nonaqueous electrolyte energy storage device may further include initially charging and discharging the assembled energy storage device uncharged or discharged. For example, when a lithium-transition metal composite oxide where the molar ratio (Li/Me) of lithium (Li) to the transition metal (Me) is more than 1.0 is used for the positive active material of the nonaqueous electrolyte energy storage device, the capacity is increased through initial charge-discharge. The number of times of charge and discharge in the initial charge-discharge may be one or two, or may be three or more. When a lithium-transition metal composite oxide where the molar ratio (Li/Me) of lithium (Li) to the transition metal (Me) is more than 1.0 is used for the positive active material of the nonaqueous electrolyte energy storage device, the positive electrode potential (positive electrode achieved potential) at the end-of-charge voltage in the initial charge-discharge is preferably 4.5 V (vs. $Li/Li^+$) or higher and 4.7 V (vs. $Li/Li^+$) or lower.

Other Embodiments

The present invention is not limited to the above embodiments, and various modifications may be made without departing from the gist of the present invention. For example, to the configuration of one embodiment, the configuration of another embodiment can be added, and a part of the configuration of one embodiment can be replaced by the configuration of another embodiment or a well-known technique. Furthermore, a part of the configuration according to one embodiment can be removed. In addition, a well-known technique can be added to the configuration according to one embodiment.

In the above embodiment, although the case where the nonaqueous electrolyte energy storage device is used as a nonaqueous electrolyte secondary battery (lithium secondary battery) that can be charged and discharged has been described, the type, shape, size, capacity, and the like of the nonaqueous electrolyte energy storage device are arbitrary. The nonaqueous electrolyte energy storage device according to the present invention can also be applied to capacitors such as various nonaqueous electrolyte secondary batteries, electric double-layer capacitors, and lithium ion capacitors.

EXAMPLES

Hereinafter, the present invention will be described in more detail with reference to examples, but the present invention is not limited to the following examples.

Example 1

As a counter electrode, a lithium foil (pure-metallic lithium 100% by mass: average thickness 300 μm) was prepared.

A copper foil (average thickness: 20 μm) was prepared as a working electrode.

As a separator, a separator (average thickness: 28 μm) with a polyvinylidene fluoride (PVDF) applied to both surfaces of a polyolefin microporous membrane (average thickness: 27 μm) was prepared.

LiFSI for a content of 2.0 $mol/dm^3$ was mixed with a mixture (amount-of-substance ratio (molar ratio) of 70:30) of a 1-methyl-1-propylpyrrolidinium bis(fluorosulfonyl)imide ($Py_{13}FSI$) as an ionic liquid and a 1,1,2,2-tetrafluoroethyl-2,2,2-trifluoroethyl ether (TFEE) as a fluorinated ether to prepare a nonaqueous electrolyte.

A nonaqueous electrolyte energy storage device (test cell) according to Example 1 was prepared with the use of a cell for electrochemical measurement (manufactured by JAPAN TOMCELL LIMITED COMPANY) as a case, and the counter electrode, working electrode, separator, and nonaqueous electrolyte mentioned above.

Comparative Example 1

A nonaqueous electrolyte energy storage device according to Comparative Example 1 was obtained similarly to Example 1 except for the use of $Py_{13}FSI$ instead of the mixture of $Py_{13}FSI$ and TFEE.

Reference Example 1

A nonaqueous electrolyte energy storage device according to Reference Example 1 was obtained similarly to Comparative Example 1.

Example 2

A nonaqueous electrolyte energy storage device according to Example 2 was obtained similarly to Example 1 except that the content of LiFSI in the nonaqueous electrolyte was 1.0 $mol/dm^3$.

Comparative Example 2

A nonaqueous electrolyte energy storage device according to Comparative Example 2 was obtained similarly to Example 2 except for the use of $Py_{13}FSI$ instead of the mixture of $Py_{13}FSI$ and TFEE.

Comparative Example 3

A nonaqueous electrolyte energy storage device according to Comparative Example 3 was obtained similarly to Example 2 except for the use of a 2,2,2-trifluoroethy methyl carbonate (TFEMC) as a fluorinated carbonate instead of the TFEE.

Comparative Example 4

A nonaqueous electrolyte energy storage device according to Comparative Example 4 was obtained similarly to Example 2 except for the use of a 2,2,2-trifluoroethyl acetate (FEA) as a fluorinated ester instead of the TFEE.

Reference Example 2

A nonaqueous electrolyte energy storage device according to Reference Example 2 was obtained similarly to Example 2 except for the use of, as a nonaqueous electrolyte, a nonaqueous electrolyte prepared by mixing $LiPF_6$ for a content of 1.0 mol/dm$^3$ in a mixture of a fluoroethylene carbonate (FEC) and a 2,2,2-trifluoroethyl methyl carbonate (TFEMC) (volume ratio: 30:70).

(Evaluation: Short Circuit Checking Test)

The respective nonaqueous electrolyte energy storage devices according to Examples 1 and 2, Comparative Examples 1 to 4, and Reference Examples 1 and 2 were subjected to the following charge-discharge. At 25° C., constant current charge was performed at a charge current of 0.2 C. With regard to the charge termination conditions, charge was performed until the charge voltage reached 3.0 V, or until the total charge time reached 5 hours. Further, in each of the nonaqueous electrolyte energy storage devices according to Examples 1 and 2, Comparative Examples 1 to 4, and Reference Example 2, the current density per unit area of the working electrode at 1 C was set to be to 6 mA/cm$^2$. In addition, in the nonaqueous electrolyte energy storage device according to Reference Example 1, the current density per unit area of the working electrode at 1 C was set to be 1 mA/cm$^2$. It is to be noted that the "charge" in the short circuit checking test refers to transferring lithium ions and electrons from the counter electrode to the working electrode. The "discharge" in the short circuit checking test refers to transferring lithium ions and electrons from the working electrode to the counter electrode.

For each of the nonaqueous electrolyte energy storage devices according to Example 1, Comparative Example 1, and Reference Example 1, the charge-discharge was repeated about until causing a short circuit. For each of the nonaqueous electrolyte energy storage devices according to Example 2, Comparative Examples 2 to 4, and Reference Example 2, the charge-discharge was repeated for about 10 cycles.

Table 1 shows the number of charge-discharge cycles until causing a short circuit in each of the nonaqueous electrolyte energy storage devices according to Example 1, Comparative Example 1, and Reference Example 1. In addition, Table 2 shows the number of charge-discharge cycles until causing a short circuit and the coulombic efficiency of the tenth cycle in each of the nonaqueous electrolyte energy storage devices according to Example 2, Comparative Examples 2 to 4, and Reference Example 2. Further, for the nonaqueous electrolyte energy storage device according to Comparative Example 3, the coulombic efficiency of the eighth cycle is shown because a short circuit was caused in the ninth cycle. In addition, for the nonaqueous electrolyte energy storage device according to Comparative Example 4, the coulombic efficiency of the second cycle is shown because a short circuit was caused in the third cycle.

TABLE 1

| | Working electrode | | | Number of charge-discharge |
|---|---|---|---|---|
| | Type | Capacity density/ mAh/cm$^2$ | Nonaqueous electrolyte | cycles until causing short circuit |
| Example 1 | Cu | 6 | 2.0 mol/dm$^3$ LiFSI $Py_{13}$FSI/TFEE | 60 or more |
| Comparative Example 1 | Cu | 6 | 2.0 mol/dm$^3$ LiFSI $Py_{13}$FSI | 17 |
| Reference Example 1 | Cu | 1 | 2.0 mol/dm$^3$ LiFSI $Py_{13}$FSI | 100 or more |

TABLE 2

| | Working electrode | | | Number of charge-discharge cycles | |
|---|---|---|---|---|---|
| | Type | Capacity density/ mAh/cm$^2$ | Nonaqueous electrolyte | until causing short circuit | Coulombic efficiency of tenth cycle/% |
| Example 2 | Cu | 6 | 1.0 mol/dm$^3$ LiFSI $Py_{13}$ FSI/TFEE | 10 or more | 99.0 |
| Comparative Example 2 | Cu | 6 | 1.0 mol/dm$^3$ LiFSI $Py_{13}$FSI | 10 or more | 98.5 |
| Comparative Example 3 | Cu | 6 | 1.0 mol/dm$^3$ LiFSI $Py_{13}$ FSI/TFEMC | 9 | 95.3 (eighth cycle) |
| Comparative Example 4 | Cu | 6 | 1.0 mol/dm$^3$ LiFSI $Py_{13}$ FSI/FEA | 3 | 86.9 (second cycle) |
| Reference Example 2 | Cu | 6 | 1.0 mol/dm$^3$ $LiPF_6$ FEC/ TFEMC | 10 or more | 97.5 |

From the results shown in Table 1, the following is determined. First, as in the nonaqueous electrolyte energy storage device according to Reference Example 1, when the capacity density per unit area of the working electrode was less than 5 mAh/cm$^2$ with the nonaqueous electrolyte including the ionic liquid, no short circuit was caused even after 100 cycles of charge-discharge. As in the nonaqueous electrolyte energy storage device according to Comparative Example 1, when the capacity density per unit area of the working electrode was 5 mAh/cm$^2$ or more, a short circuit associated with the charge-discharge cycle was remarkably more likely to be caused. In contrast, the nonaqueous electrolyte energy storage device according to Example 1, because of the nonaqueous electrolyte including the fluorinated ether together with the ionic liquid, caused no short circuit even after performing 60 cycles of charge-discharge although the capacity density per unit area of the working electrode was 5 mAh/cm$^2$ or more, thereby resulting in any short circuit suppressed.

Furthermore, the following is determined from the results shown in Table 2. When the nonaqueous electrolyte including the ionic liquid and the fluorinated solvent other than the fluorinated ether was used as in the nonaqueous electrolyte energy storage devices according to Comparative Examples 3 and 4, a short circuit was likely to be caused, and the coulombic efficiency was also low. The nonaqueous electrolyte energy storage device according to Example 2 was higher in coulombic efficiency, as compared with the nonaqueous electrolyte energy storage device according to Comparative Example 2 with the nonaqueous electrolyte composed of only the lithium salt and the ionic liquid and the nonaqueous electrolyte energy storage device according to Reference Example 2 with the nonaqueous electrolyte including no ionic liquid.

Example 3

(Fabrication of Positive Electrode)

As a positive active material, a lithium-transition metal composite oxide (Li-rich) including an α-$NaFeO_2$-type crystal structure, represented by $Li_{1+\alpha}Me_{1-\alpha}O_2$ (Me: a transition metal), was used. In this regard, the molar ratio Li/Me of Li to Me was 1.33, and Me was composed of Ni and Mn and was contained at a molar ratio of Ni:Mn=1:2.

A positive composite paste containing the positive active material, acetylene black (AB) as a conductive agent, and polyvinylidene fluoride (PVDF) as a binder at 94:4.5:1.5 in mass ratio in terms of solid content, was prepared using N-methylpyrrolidone (NMP) as a dispersion medium. The positive composite paste was applied to one surface of an aluminum foil (average thickness: 15 μm) as a positive substrate, and dried to prepare a positive electrode with a positive active material layer (average thickness: 135 μm) disposed. It is to be noted that the positive electrode was designed such that the capacity density per unit area of the positive active material layer was 5 $mAh/cm^2$.

(Fabrication of Negative Electrode)

A lithium foil made of pure-metallic lithium was layered on one surface of a copper foil (average thickness: 10 μm) as a negative substrate, and then pressed to prepare a negative electrode with a negative active material layer (average thickness: 60 μm) disposed.

(Preparation of Nonaqueous Electrolyte)

LiFSI for a content of 2.0 $mol/dm^3$ was mixed with a mixture (amount-of-substance ratio (molar ratio) of 70:30) of a 1-methyl-1-propylpyrrolidinium bis(fluorosulfonyl)imide ($Py_{13}FSI$) as an ionic liquid and a 1,1,2,2-tetrafluoroethyl-2,2,2-trifluoroethyl ether (TFEE) as a fluorinated ether to prepare a nonaqueous electrolyte.

(Preparation of Separator)

As a separator, a separator with a polyvinylidene fluoride (PVDF) applied to both surfaces of a polyolefin microporous membrane was prepared.

(Fabrication of Nonaqueous Electrolyte Energy Storage Device)

An electrode assembly was produced by laminating the positive electrode and the negative electrode with the above-mentioned separator interposed between the electrodes. The electrode assembly was enclosed in a case made from a metal-resin composite film, then the nonaqueous electrolyte was injected into the inside of the case, and then an opening of the case was sealed by heat sealing to obtain a nonaqueous electrolyte energy storage device with the case pressurized from the outside at 0.3 MPa according to Example 3.

Reference Example 3

A nonaqueous electrolyte energy storage device according to Reference Example 3 was obtained similarly to Example 3 except for the use of, as a nonaqueous electrolyte, a nonaqueous electrolyte prepared by mixing $LiPF_6$ for a content of 1.0 $mol/dm^3$ in a mixture of a fluoroethylene carbonate (FEC) and a 2,2,2-trifluoroethyl methyl carbonate (TFEMC) (volume ratio: 30:70), and the use of, as a separator, a polyolefin microporous membrane without any polyvinylidene fluoride (PVDF) applied to both surfaces of the membrane.

(Initial Charge-Discharge)

The respective nonaqueous electrolyte energy storage devices according to Example 3 and Reference Example 3 were subjected to the initial charge-discharge under the following conditions. At 25° C., constant current constant voltage charge was performed at a charge current of 0.1 C and an end-of-charge voltage of 4.6 V. With regard to the charge termination conditions, charge was performed until the charge current reached 0.02 C. Thereafter, a pause time of 10 minutes was provided. Thereafter, constant current discharge was performed at a discharge current of 0.1 C and an end-of-discharge voltage of 2.0 V, and then a pause time of 10 minutes was provided. This charge-discharge cycle was performed for 2 cycles.

(Charge-Discharge Cycle Test)

Subsequently, the following charge-discharge cycle test was performed. At 25° C., constant current constant voltage charge was performed at a charge current of 0.2 C and an end-of-charge voltage of 4.6 V. With regard to the charge termination conditions, charge was performed until the charge current reached 0.05 C. Thereafter, a pause time of 10 minutes was provided. Thereafter, constant current discharge was performed at a discharge current of 0.1 C and an end-of-discharge voltage of 2.0 V, and then a pause time of 10 minutes was provided. This charge-discharge cycle was repeated for 50 cycles. The percentage of the discharge capacity of the 50-th cycle to the discharge capacity of the first cycle was obtained as a capacity retention ratio. The results are shown in Table 3.

TABLE 3

| | Positive electrode | | | |
|---|---|---|---|---|
| | Type | Capacity density/ $mAh/cm^2$ | Nonaqueous electrolyte | Capacity retention ratio/% |
| Example 3 | Li-rich | 5 | 2.0 $mol/dm^3$ LiFSI $Py_{13}FSI$/TFEE | 98.9 |
| Reference Example 3 | Li-rich | 5 | 1.0 $mol/dm^3$ $LiPF_6$ FEC/ TFEMC | 96.5 |

As shown in Table 3, it has been successfully confirmed that the nonaqueous electrolyte energy storage device according to Example 3, including the nonaqueous electrolyte including the ionic liquid and the fluorinated ether was high in capacity retention ratio in the charge-discharge cycle. In addition, the coulombic efficiency of the 50-th cycle in the nonaqueous electrolyte energy storage device according to Example 3 was higher than 99.9%.

Further, a nonaqueous electrolyte energy storage device obtained similarly to Example 3 except that the 1-methyl-1-propylpyrrolidinium bis(fluorosulfonyl)imide ($Py_{13}FSI$) as an ionic liquid was changed to a trimethylpropylphosphonium bis(fluorosulfonyl)imide ($P_{1113}FSI$) was similarly subjected to a charge-discharge cycle test, and as a result, it has been successfully confirmed that the obtained nonaqueous electrolyte energy storage device has a 50-th cycle coulombic efficiency and a capacity retention ratio, which are as high as those of the nonaqueous electrolyte energy storage device according to Example 3.

Example 4

A nonaqueous electrolyte energy storage device according to Example 4 was obtained similarly to Example 3 mentioned above. More specifically, in Example 4, a 1,1,2,2-tetrafluoroethyl-2, 2,2-trifluoroethyl ether (TFEE) was used as a fluorinated ether.

Example 5

A nonaqueous electrolyte energy storage device according to Example 5 was obtained similarly to Example 4 except that the fluorinated ether was changed to an ethyl-1,1,2,2-tetrafluoroethyl ether (ETFEE).

Example 6

A nonaqueous electrolyte energy storage device according to Example 6 was obtained similarly to Example 4 except that the fluorinated ether was changed to a 1,1,2,2-tetrafluoroethyl-2,2,3,3-tetrafluoropropyl ether (TFETFPE).

Example 7

A nonaqueous electrolyte energy storage device according to Example 7 was obtained similarly to Example 4 except that the ionic liquid was changed to a trimethylpropylphosphonium bis(fluorosulfonyl)imide ($P_{1113}FSI$).

Example 8

A nonaqueous electrolyte energy storage device according to Example 8 was obtained similarly to Example 4 except that the ionic liquid was changed to a trimethylmethoxymethylphosphonium bis(fluorosulfonyl)imide ($P_{111(101)}FSI$).

(Initial Charge-Discharge)

The respective nonaqueous electrolyte energy storage devices according to Examples 4 to 8 were subjected to the initial charge-discharge under the following conditions.

At 25° C., constant current constant voltage charge was performed at a charge current of 0.1 C and an end-of-charge voltage of 4.6 V. With regard to the charge termination conditions, charge was performed until the charge current reached 0.02 C. Thereafter, a pause time of 10 minutes was provided. Thereafter, constant current discharge was performed at a discharge current of 0.1 C and an end-of-discharge voltage of 2.0 V, and then a pause time of 10 minutes was provided.

Then, constant current constant voltage charge was performed at a charge current of 0.2 C and an end-of-charge voltage of 4.6 V. With regard to the charge termination conditions, charge was performed until the charge current reached 0.05 C. Thereafter, a pause time of 10 minutes was provided. Thereafter, constant current discharge was performed at a discharge current of 0.1 C and an end-of-discharge voltage of 2.0 V.

(Charge-Discharge Cycle Test)

Then, each of the obtained nonaqueous electrolyte energy storage devices according to Examples 4 to 8 was subjected to the following charge-discharge cycle test. At 25° C., constant current constant voltage charge was performed at a charge current of 0.2 C and an end-of-charge voltage of 4.6 V. With regard to the charge termination conditions, charge was performed until the charge current reached 0.05 C. Thereafter, a pause time of 10 minutes was provided. Thereafter, constant current discharge was performed at a discharge current of 0.1 C and an end-of-discharge voltage of 2.0 V, and then a pause time of 10 minutes was provided. This charge-discharge cycle was performed until a short circuit was caused.

It is to be noted that two samples were prepared for each of the nonaqueous electrolyte energy storage devices according to Examples 7 and 8, and subjected to the initial charge-discharge and charge-discharge cycle test mentioned above. Table 4 shows the number of charge-discharge cycles until causing a short circuit. In addition, the percentage of the discharge capacity of the 80th cycle to the discharge capacity of the first cycle in each of the nonaqueous electrolyte energy storage devices according to Examples 4 to 6 was obtained as the capacity retention ratio. The results are shown in Table 4.

TABLE 4

| | Positive electrode | | | Number of charge-discharge | Capacity retention |
|---|---|---|---|---|---|
| | Type | Capacity density/ $mAh/cm^2$ | Nonaqueous electrolyte | cycles until causing short circuit | ratio at 80th cycle/% |
| Example 4 | Li-rich | 5 | 2.0 $mol/dm^3$ LiFSI $Py_{13}FSI$/ TFEE | 104 | 98.4 |
| Example 5 | Li-rich | 5 | 2.0 $mol/dm^3$ LiFSI $Py_{13}FSI$/ ETFEE | 125 | 97.2 |
| Example 6 | Li-rich | 5 | 2.0 $mol/dm^3$ LiFSI $Py_{13}FSI$/ TFETFPE | 85 | 98.8 |
| Example 7 | Li-rich | 5 | 2.0 $mol/dm^3$ LiFSI $P_{1113}FSI$/ TFEE | 102,104 | — |
| Example 8 | Li-rich | 5 | 2.0 $mol/dm^3$ LiFSI $P_{111(101)}$ FSI/TFEE | 32.40 | — |

From the results shown in Table 4, the following is determined. From the comparison among the respective nonaqueous electrolyte energy storage devices according to Examples 4 to 6, it has been successfully confirmed that the use of the fluorinated ether having a small number of fluorine atoms tends to increase the number of charge-discharge cycles until causing a short circuit, thereby further suppressing the short circuit. In contrast, it has been successfully confirmed that the use of a fluorinated ether having a large number of fluorine atoms tends to increase the capacity retention ratio after the charge-discharge cycle. In addition, from the comparison between the nonaqueous electrolyte energy storage device according to Example 8 and the nonaqueous electrolyte energy storage devices according to the other examples, it has been confirmed that when the ionic liquid mainly contains an ionic liquid ($Py_{13}FSI$ or $P_{1113}FSI$) including no ether group, the number of cycles until causing a short circuit is particularly large, thereby particularly sufficiently suppressing any short circuit.

INDUSTRIAL APPLICABILITY

The present invention can be applied to a nonaqueous electrolyte energy storage device and the like used as a power source for electronic devices such as personal computers and communication terminals, and automobiles and the like.

DESCRIPTION OF REFERENCE SIGNS

1: nonaqueous electrolyte energy storage device

2: electrode assembly

3: case

4: positive electrode terminal

41: positive electrode lead

5: negative electrode terminal

51: negative electrode lead

20: energy storage unit

30: energy storage apparatus

The invention claimed is:

1. A nonaqueous electrolyte energy storage device comprising:

a positive electrode including a positive active material layer of 5 $mAh/cm^2$ or more in capacity density per unit area;

a negative electrode including metallic lithium; and a nonaqueous electrolyte including an ionic liquid and a fluorinated ether, wherein the ionic liquid mainly contains an ionic liquid including no ether group.

2. The nonaqueous electrolyte energy storage device according to claim 1, wherein the positive electrode contains a lithium-transition metal composite oxide that has an $\alpha$-$NaFeO_2$-type crystal structure or a spinel-type crystal structure, or a polyanion compound containing nickel, cobalt, or manganese.

3. The nonaqueous electrolyte energy storage device according to claim 1, wherein a positive electrode potential at an end-of-charge voltage under normal usage is 3.5 V (vs. $Li/Li^+$) or more.

4. The nonaqueous electrolyte energy storage device according to claim 1, wherein the nonaqueous electrolyte further contains a lithium bis(fluorosulfonyl)imide.

5. The nonaqueous electrolyte energy storage device according to claim 1, wherein the nonaqueous electrolyte further contains a lithium salt, and a content of the lithium salt in the nonaqueous electrolyte is 1.5 $mol/dm^3$ or more.

6. The nonaqueous electrolyte energy storage device according to claim 1, wherein the number of fluorine atoms in the fluorinated ether is two or more and six or less.

7. The nonaqueous electrolyte energy storage device according to claim 1, wherein a ratio of the number of fluorine atoms to a total of the number of hydrogen atoms and the number of fluorine atoms in the fluorinated ether is 10% or more and 50% or less.

8. The nonaqueous electrolyte energy storage device according to claim 1, wherein the fluorinated ether is represented by the following formula (1):

$$R^1—O—R^2 \qquad (1)$$

wherein in the formula (1), $R^1$ is a fluorinated hydrocarbon group, and $R^2$ is a hydrocarbon group.

9. The nonaqueous electrolyte energy storage device according to claim 1, wherein a content of the fluorinated ether in all nonaqueous solvents included in the nonaqueous electrolyte is 90% by volume or more.

10. The nonaqueous electrolyte energy storage device according to claim 1, comprising a separator of 10 μm or more and 40 μm or less in average thickness.

11. A method for manufacturing a nonaqueous electrolyte energy storage device, the method comprising:

preparing a positive electrode including a positive active material layer of 5 $mAh/cm^2$ or more in capacity density per unit area;

preparing a negative electrode including metal lithium, or a surface region capable of depositing metal lithium during charge; and preparing a nonaqueous electrolyte including an ionic liquid and a fluorinated ether, wherein the ionic liquid mainly contains an ionic liquid including no ether group.

* * * * *